United States Patent
Zia et al.

(10) Patent No.: US 12,550,050 B2
(45) Date of Patent: Feb. 10, 2026

(54) TECHNIQUES FOR NON-INTEGRATED TRAFFIC AGGREGATION, STEERING, AND SWITCHING FOR A PROTOCOL DATA UNIT SESSION

(71) Applicant: QUALCOMM Incorporated, San Diego, CA (US)

(72) Inventors: Waqar Zia, Munich (DE); Haris Zisimopoulos, London (GB); Dario Serafino Tonesi, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 17/885,191

(22) Filed: Aug. 10, 2022

(65) Prior Publication Data
US 2024/0056955 A1    Feb. 15, 2024

(51) Int. Cl.
*H04W 48/16*    (2009.01)
*H04W 28/08*    (2023.01)
(Continued)

(52) U.S. Cl.
CPC ........... *H04W 48/16* (2013.01); *H04W 28/08* (2013.01); *H04W 40/02* (2013.01); *H04W 76/10* (2018.02); *H04W 88/182* (2013.01)

(58) Field of Classification Search
CPC ..... H04W 48/16; H04W 28/08; H04W 40/02; H04W 76/10; H04W 88/182
See application file for complete search history.

(56) References Cited

U.S. PATENT DOCUMENTS

2020/0236727 A1*    7/2020   Salkintzis   ............. H04W 48/18
2020/0336940 A1*    10/2020  Salkintzis   ......... H04W 28/0942
(Continued)

OTHER PUBLICATIONS

Bagnulo M., "Threat Analysis for TCP Extensions for Multipath Operation with Multiple Addresses", Internet Engineering Task Force (IETF), RFC: 6181, Mar. 2011, pp. 1-17.
(Continued)

Primary Examiner — Rina C Pancholi
(74) Attorney, Agent, or Firm — Dalei Dong; Harrity & Harrity, LLP

(57) ABSTRACT

Various aspects of the present disclosure generally relate to wireless communication. In some aspects, a network node (e.g., a session management function (SMF)) may receive policy and charging control (PCC) rules that include control information associated with a non-integrated aggregation (NIA) protocol data unit (PDU) session requested by a user equipment (UE). The SMF may communicate, to the UE, one or more access traffic steering, switching, and splitting (ATSSS) rules derived from the PCC rules, wherein the one or more ATSSS rules are for controlling traffic steering, switching, and splitting associated with the NIA PDU session in an uplink direction. The network node may communicate, to a user plane function (UPF), N4 interface rules derived from the PCC rules, wherein the N4 interface rules are for controlling traffic steering, switching, and splitting associated with the NIA PDU session in a downlink direction. Numerous other aspects are described.

30 Claims, 14 Drawing Sheets

(51) Int. Cl.
*H04W 40/02* (2009.01)
*H04W 76/10* (2018.01)
*H04W 88/18* (2009.01)

(56) References Cited

U.S. PATENT DOCUMENTS

| | | | | |
|---|---|---|---|---|
| 2021/0007166 A1* | 1/2021 | Liao | ..................... | H04W 48/16 |
| 2021/0037585 A1* | 2/2021 | Youn | ..................... | H04W 60/06 |
| 2022/0116822 A1* | 4/2022 | Sahin | ..................... | H04L 67/56 |
| 2022/0264679 A1* | 8/2022 | Tamura | ................. | H04W 76/15 |
| 2023/0247482 A1* | 8/2023 | Liebhart | ............... | H04W 76/12 |
| | | | | 370/329 |
| 2023/0300674 A1* | 9/2023 | Kedalagudde | ........ | H04W 24/10 |
| | | | | 370/230.1 |

OTHER PUBLICATIONS

Berne., "From Blockers for Advertising Calls to Boosters for Internet Access: New Services for Your Home", Swisscom, Nov. 15, 2016, 2 pages.

Bonaventure O., et al., "0-RTT TCP Convert Protocol", Internet Engineering Task Force (IETF), RFC: 8803, Jul. 2020, pp. 1-42.

Deng L., et al., "Use-cases and Requirements for MPTCP Proxy in ISP Networks draft-deng-mptcp-proxy-01", MPTCP Working Group, Oct. 24, 2014, pp. 1-15.

"Enhancing Internet Connectivity with MultiPath TCP", MPTCP Deployment Options, Mar. 18, 2019, 8 pages.

Ford A., et al., "Architectural Guidelines for Multipath TCP Development; rfc6182.txt", Internet Engineering Task Force, IETF; Standard, Internet Society (ISOC) 4, Rue Des Falaises CH-1205 Geneva, Switzerland, Mar. 22, 2011 (Mar. 22, 2011), pp. 1-28, XP015075927, [retrieved on Mar. 22, 2011].

Ford A., et al., "TCP Extensions for Multipath Operation with Multiple Addresses", Internet Engineering Task Force (IETF), RFC: 6824, Jan. 2013, pp. 1-64.

Ford A., et al., "TCP Extensions for Multipath Operation with Multiple Addresses", Internet Engineering Task Force (IETF), RFC: 8684, Mar. 2020, pp. 1-56.

Kang Y., et al., "Multipath Transmission Control Protocol-based Multi-access Traffic Steering Solution for 5G Multimediacentric Network: Design and Testbed System Implementation", International Journal of Distributed Sensor Networks, vol. 16, No. 2, 2020, pp. 1-18.

Pauly T., et al., "IP Proxying Support for HTTP", Masque, draft-ietf-masque-connect-ip-01, Mar. 5, 2022, pp. 1-17.

"Performance Analysis—MPTCP Deployment Options", Tessares, Mar. 19, 2019, 5 pages.

Schinazi D., "Proxying UDP in HTTP", Masque, draft-ietf-masque-connect-udp-14, Jun. 8, 2022, pp. 1-12.

Seo S.H., et al., "KT's MPTCP Proxy Experiences Deployment and Testing Considerations", IETF 91—MPTCP WG, Nov. 14, 2014, 8 pages.

Seo S.H., "KT's GiGA LTE—Mobile MPTCP Proxy Deployment", IETF 97—Banana BoF, Nov. 2016, 5 pages.

Trilogy 2, "The Deployment of Multipath TCP in Korea goes beyond KT", Building the Liquid Net, retrieved on Aug. 5, 2022, 2 pages.

* cited by examiner

TECHNIQUES FOR NON-INTEGRATED TRAFFIC AGGREGATION, STEERING, AND SWITCHING FOR A PROTOCOL DATA UNIT SESSION

FIELD OF THE DISCLOSURE

Aspects of the present disclosure generally relate to wireless communication and to techniques and apparatuses for non-integrated traffic aggregation, steering, and switching for a protocol data unit (PDU) session.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include transmitting, over a wireless access link, a request to establish a non-integrated aggregation (NIA) protocol data unit (PDU) session, wherein the request includes access traffic steering, switching, and splitting (ATSSS) capability information indicating one or more proxy types that the UE supports using to steer traffic associated with the NIA PDU session. The method may include receiving, over the wireless access link, a message indicating that the NIA PDU session was established and including one or more ATSSS rules for controlling traffic steering, switching, and splitting associated with the NIA PDU session.

Some aspects described herein relate to a method of wireless communication performed by a network node. The method may include receiving policy and charging control (PCC) rules that include control information associated with an NIA PDU session requested by a UE, wherein the PCC rules are based at least in part on one or more proxy types that the UE supports using to steer traffic associated with the NIA PDU session. The method may include communicating, to the UE, one or more ATSSS rules that are derived from the PCC rules, wherein the one or more ATSSS rules are for controlling traffic steering, switching, and splitting associated with the NIA PDU session in an uplink direction. The method may include communicating, to a user plane function (UPF), N4 interface rules that are derived from the PCC rules, wherein the N4 interface rules are for controlling traffic steering, switching, and splitting associated with the NIA PDU session in a downlink direction.

Some aspects described herein relate to a UE for wireless communication. The UE may include a memory and one or more processors coupled to the memory. The one or more processors may be configured to transmit, over a wireless access link, a request to establish an NIA PDU session, wherein the request includes ATSSS capability information indicating one or more proxy types that the UE supports using to steer traffic associated with the NIA PDU session. The one or more processors may be configured to receive, over the wireless access link, a message indicating that the NIA PDU session was established and including one or more ATSSS rules for controlling traffic steering, switching, and splitting associated with the NIA PDU session.

Some aspects described herein relate to a network node for wireless communication. The network node may include a memory and one or more processors coupled to the memory. The one or more processors may be configured to receive PCC rules that include control information associated with an NIA PDU session requested by a UE, wherein the PCC rules are based at least in part on one or more proxy types that the UE supports using to steer traffic associated with the NIA PDU session. The one or more processors may be configured to communicate, to the UE, one or more ATSSS rules that are derived from the PCC rules, wherein the one or more ATSSS rules are for controlling traffic steering, switching, and splitting associated with the NIA PDU session in an uplink direction. The one or more processors may be configured to communicate, to a UPF, N4 interface rules that are derived from the PCC rules, wherein the N4 interface rules are for controlling traffic steering, switching, and splitting associated with the NIA PDU session in a downlink direction.

Some aspects described herein relate to a non-transitory computer-readable medium that stores a set of instructions for wireless communication by a UE. The set of instructions, when executed by one or more processors of the UE, may cause the UE to transmit, over a wireless access link, a request to establish an NIA PDU session, wherein the request includes ATSSS capability information indicating one or more proxy types that the UE supports using to steer traffic associated with the NIA PDU session. The set of instructions, when executed by one or more processors of the UE, may cause the UE to receive, over the wireless access link, a message indicating that the NIA PDU session was established and including one or more ATSSS rules for controlling traffic steering, switching, and splitting associated with the NIA PDU session.

Some aspects described herein relate to a non-transitory computer-readable medium that stores a set of instructions for wireless communication by a network node. The set of instructions, when executed by one or more processors of the network node, may cause the network node to receive PCC rules that include control information associated with an NIA PDU session requested by a UE, wherein the PCC rules are based at least in part on one or more proxy types that the UE supports using to steer traffic associated with the NIA PDU session. The set of instructions, when executed by one or more processors of the network node, may cause the network node to communicate, to the UE, one or more ATSSS rules that are derived from the PCC rules, wherein the one or more ATSSS rules are for controlling traffic steering, switching, and splitting associated with the NIA PDU session in an uplink direction. The set of instructions, when executed by one or more processors of the network node, may cause the network node to communicate, to a UPF, N4 interface rules that are derived from the PCC rules, wherein the N4 interface rules are for controlling traffic steering, switching, and splitting associated with the NIA PDU session in a downlink direction.

Some aspects described herein relate to an apparatus for wireless communication. The apparatus may include means for transmitting, over a wireless access link, a request to establish an NIA PDU session, wherein the request includes ATSSS capability information indicating one or more proxy types that the UE supports using to steer traffic associated with the NIA PDU session. The apparatus may include means for receiving, over the wireless access link, a message indicating that the NIA PDU session was established and including one or more ATSSS rules for controlling traffic steering, switching, and splitting associated with the NIA PDU session.

Some aspects described herein relate to an apparatus for wireless communication. The apparatus may include means for receiving PCC rules that include control information associated with an NIA PDU session requested by a UE, wherein the PCC rules are based at least in part on one or more proxy types that the UE supports using to steer traffic associated with the NIA PDU session. The apparatus may include means for communicating, to the UE, one or more ATSSS rules that are derived from the PCC rules, wherein the one or more ATSSS rules are for controlling traffic steering, switching, and splitting associated with the NIA PDU session in an uplink direction. The apparatus may include means for communicating, to a UPF, N4 interface rules that are derived from the PCC rules, wherein the N4 interface rules are for controlling traffic steering, switching, and splitting associated with the NIA PDU session in a downlink direction.

Aspects generally include a method, apparatus, system, computer program product, non-transitory computer-readable medium, user equipment, base station, network entity, network node, core network device, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
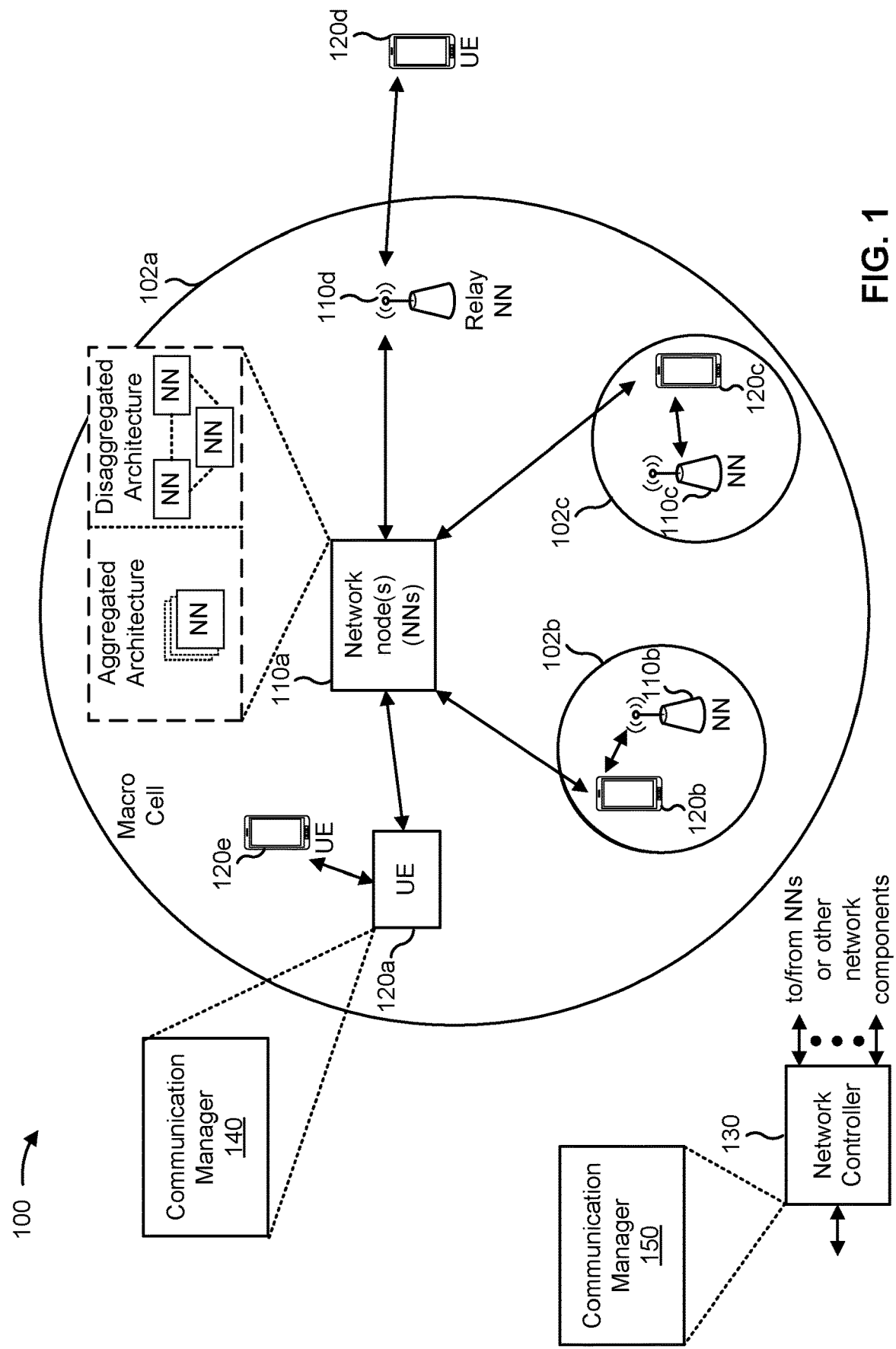
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device. For example, in some aspects, the network controller 130 may be a core network device that implements an access and mobility management function (AMF), a session management function (SMF), a policy control function (PCF), a user plane function (UPF), unified data management (UDM), and/or another suitable core network function.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed with other non-3GPP or non-cellular RATs (e.g., a RAT implementing one or more Institute of Electrical and Electronics Engineers (IEEE) 802.11 technical standards for wide local area network (WLAN) communication, commonly referred to as Wi-Fi). In some examples, one or more UEs 120 may communicate over a 3GPP access path, a non-3GPP access path, and/or an Internet Protocol (IP) network, among other examples.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a UE 120 may include a communication manager 140. As described in more detail elsewhere herein, the communication manager 140 may transmit, over a wireless access link, a request to establish a non-integrated aggregation (NIA) protocol data unit (PDU) session, wherein the request includes access traffic steering, switching, and splitting (ATSSS) capability information indicating one or more proxy types that the UE 120 supports using to steer traffic associated with the NIA PDU session. The communication manager 140 may receive, over the wireless access link, a message indicating that the NIA PDU session was established and including one or more ATSSS rules for controlling traffic steering, switching, and splitting associated with the NIA PDU session. Additionally, or alternatively, the communication manager 140 may perform one or more other operations described herein.

In some aspects, a network controller 130 may include a communication manager 150. As described in more detail elsewhere herein, the communication manager 150 may receive policy and charging control (PCC) rules that include control information associated with an NIA PDU session requested by a UE 120, wherein the PCC rules are based at least in part on one or more proxy types that the UE 120 supports using to steer traffic associated with the NIA PDU session. The communication manager 150 may communicate, to the UE 120, one or more ATSSS rules that are derived from the PCC rules, wherein the one or more ATSSS rules are for controlling traffic steering, switching, and splitting associated with the MA PDU session in an uplink direction. The communication manager 150 may communicate, to a user plane function (UPF), N4 interface rules that are derived from the PCC rules, wherein the N4 interface rules are for controlling traffic steering, switching, and splitting associated with the NIA PDU session in a downlink direction. Additionally, or alternatively, the communication manager 150 may perform one or more other operations described herein.

As indicated above, FIG. 1 is provided as an example. Other examples may differ from what is described with regard to FIG. 1.

Figure 2:
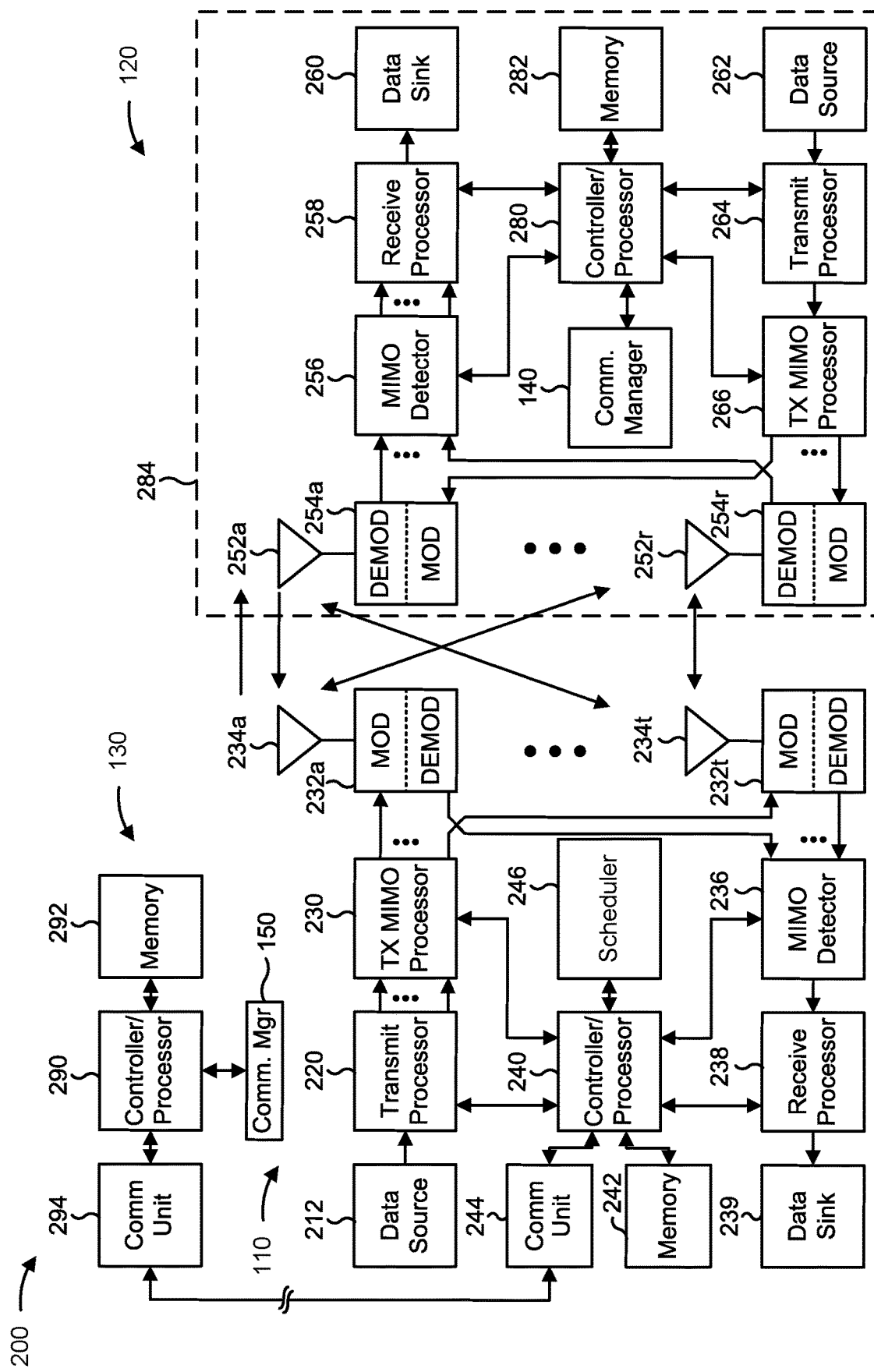
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MC S(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 7A-7B, FIGS. 8A-8B, and/or FIGS. 9-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 7A-7B, FIGS. 8A-8B, and/or FIGS. 9-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, the controller/processor 290 of the network controller 130, or any other component(s) of FIG. 2 may perform one or more techniques associated with non-integrated traffic aggregation, steering, and switching for a PDU session, as described in more detail elsewhere herein. For example, the controller/processor 240 of the network node 110, the controller/processor 280 of the UE 120, the controller/processor 290 of the network controller 130, or any other component(s) (or combinations of components) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 may include means for transmitting, over a wireless access link, a request to establish an NIA PDU session, wherein the request includes ATSSS capability information indicating one or more proxy types that the UE supports using to steer traffic associated with the NIA PDU session; and/or means for receiving, over the wireless access link, a message indicating that the NIA PDU session was established and including one or more ATS SS rules for controlling traffic steering, switching, and splitting associated with the NIA PDU session. In some aspects, the means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network controller 130 may include means for receiving PCC rules that include control information associated with an NIA PDU session requested by a UE 120, wherein the PCC rules are based at least in part on one or more proxy types that the UE supports using to steer traffic associated with the NIA PDU session; means for communicating, to the UE 120, one or more ATSSS rules that are derived from the PCC rules, wherein the one or more ATSSS rules are for controlling traffic steering, switching, and splitting associated with the MA PDU session in an uplink direction; and/or means for communicating, to a UPF, N4 interface rules that are derived from the PCC rules, wherein the N4 interface rules are for controlling traffic steering, switching, and splitting associated with the NIA PDU session in a downlink direction like. In some aspects, the means for the network controller 130 to perform operations described herein may include, for example, one or more of communication manager 150, controller/processor 290, memory 292, or communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
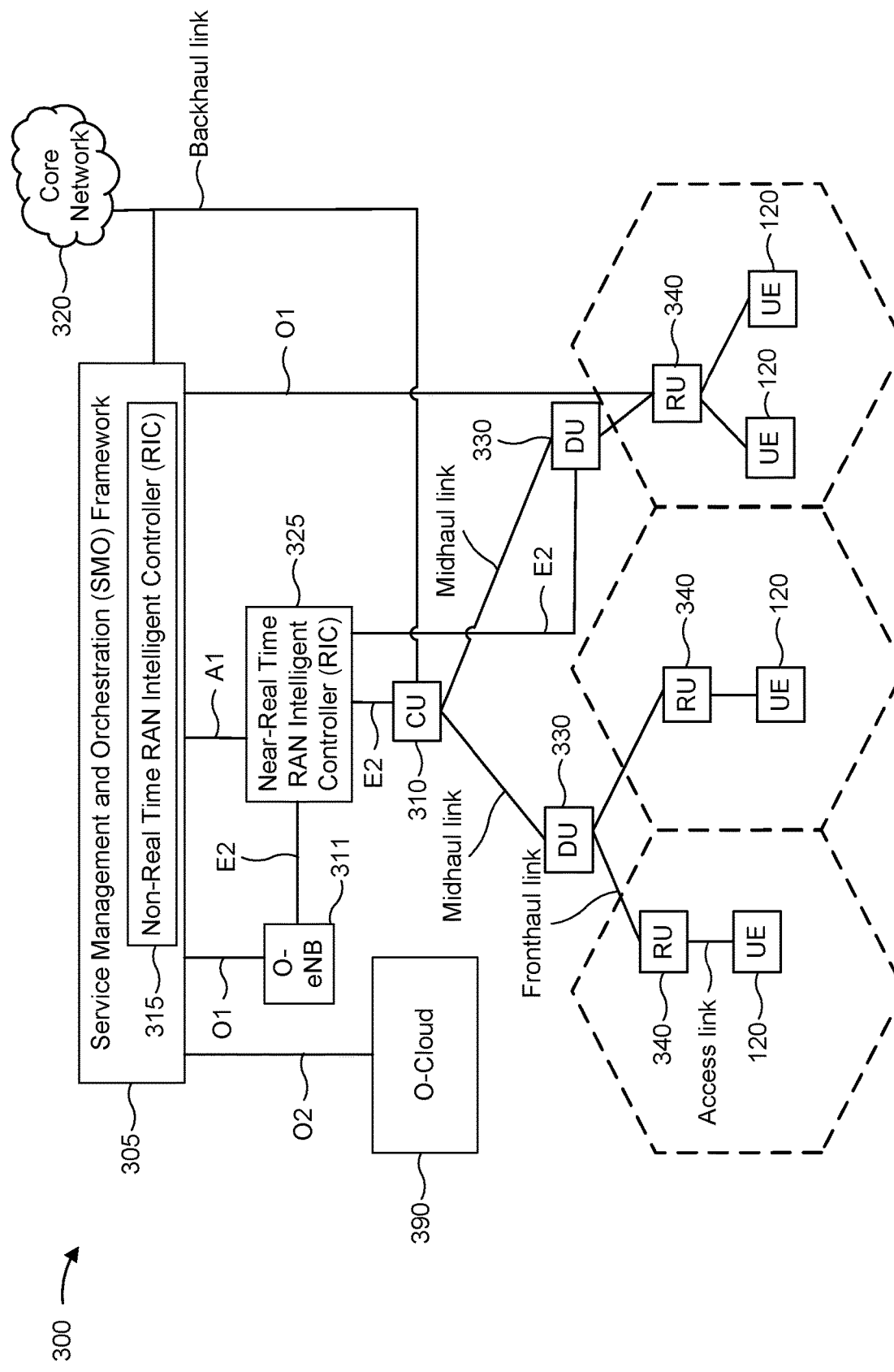
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
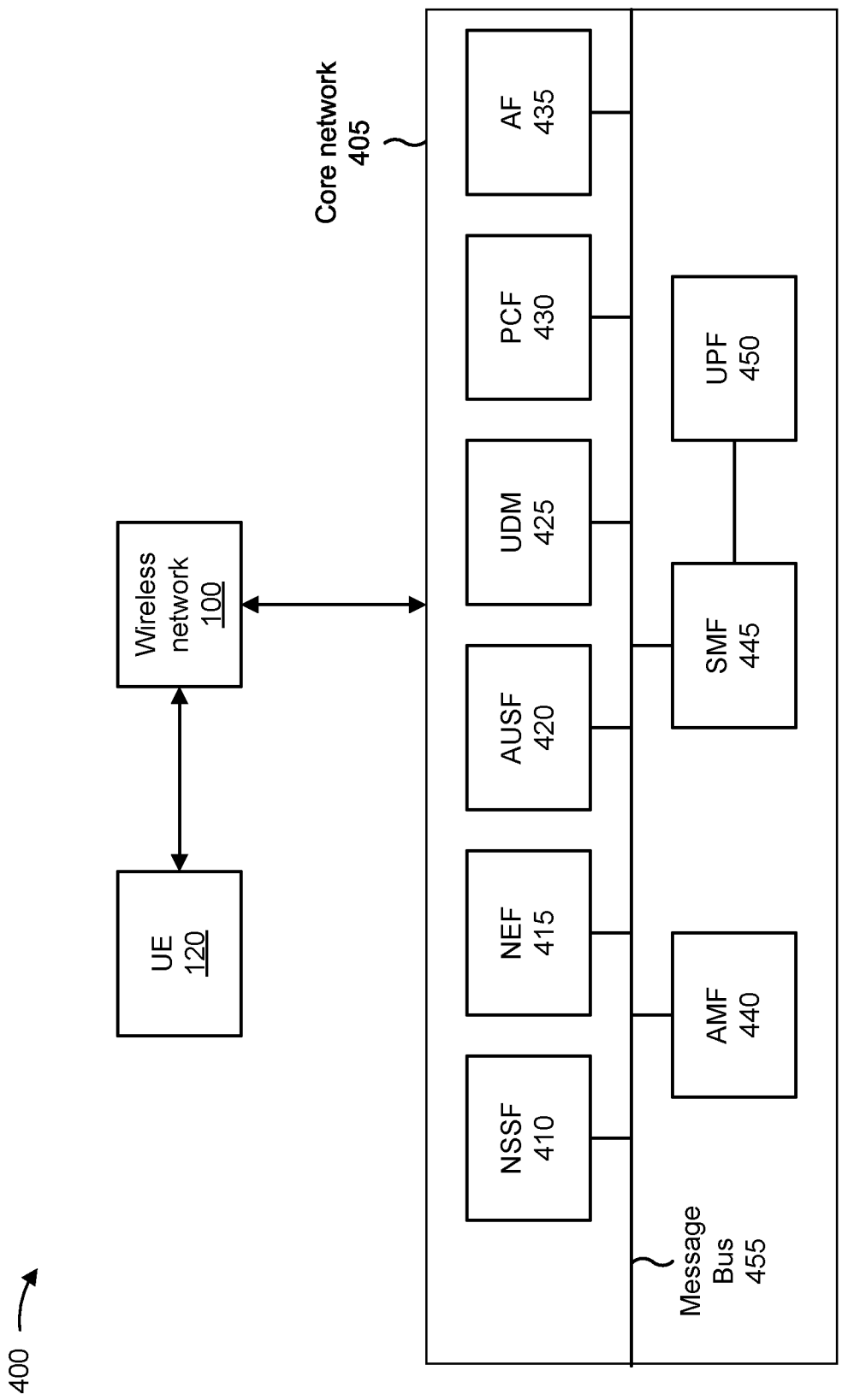
FIG. 4 is a diagram of an example of a core network, in accordance with the present disclosure.

FIG. 4 is a diagram of an example 400 of a core network 405, in accordance with the present disclosure. As shown in FIG. 4, example 400 may include a UE 120, a wireless network 100, and the core network 405. Devices (e.g., core network entities) and/or networks of example 400 may interconnect via wired connections, wireless connections, or a combination thereof.

The UE 120 may include one or more devices capable of receiving, generating, storing, processing, and/or providing information, such as information described herein. For example, the UE 120 may include a mobile phone (e.g., a smart phone or a radiotelephone, among other examples), a laptop computer, a tablet computer, a desktop computer, a handheld computer, a gaming device, a wearable communication device (e.g., a smart watch or a pair of smart glasses, among other examples), a mobile hotspot device, a fixed wireless access device, customer premises equipment, an autonomous vehicle, or a similar type of device.

The wireless network 100 may support, for example, a cellular RAT. The wireless network 100 may include one or more network entities, such as network nodes (e.g., base transceiver stations, radio base stations, node Bs, eNBs, gNBs, base station subsystems, cellular sites, cellular towers, access points, TRPs, radio access nodes, macrocell base stations, microcell base stations, picocell base stations, femtocell base stations, RUs, DUs, CUs, or similar types of devices) and other network entities that can support wireless communication for the UE 120. The wireless network 100 may transfer traffic between the UE 120 (e.g., using a 3GPP or cellular RAT) on a 3GPP access path, one or more network nodes (e.g., using a wireless interface or a backhaul interface, such as a wired backhaul interface), and/or the core network 405. The wireless network 100 may provide one or more cells that cover geographic areas. In some aspects, the wireless network 100 may transfer traffic between the UE 120, one or more network nodes, and/or the core network 405 using a non-3GPP or non-cellular RAT on a non-3GPP access path.

In some aspects, the wireless network 100 may perform scheduling and/or resource management for the UE 120 covered by the wireless network 100 (e.g., the UE 120 covered by a cell provided by the wireless network 100). In some aspects, the wireless network 100 may be controlled or coordinated by a network controller, which may perform load balancing and/or network-level configuration, among other examples. As described above in connection with FIG. 1, the network controller may communicate with the wireless network 100 via a wireless or wireline backhaul. In some aspects, the wireless network 100 may include a network controller, a self-organizing network (SON) module or component, or a similar module or component. Accordingly, the wireless network 100 may perform network control, scheduling, and/or network management functions (e.g., for uplink, downlink, and/or sidelink communications of the UE 120 covered by the wireless network 100).

In some aspects, the core network 405 may include an example functional architecture in which systems and/or methods described herein may be implemented. For example, the core network 405 may include an example architecture of a 5G core (5GC) network included in a 5G wireless telecommunications system. Although the example architecture of the core network 405 shown in FIG. 4 may be an example of a service-based architecture, in some aspects, the core network 405 may be implemented as a reference-point architecture and/or a 4G core network, among other examples.

As shown in FIG. 4, the core network 405 may include a number of functional elements in devices (e.g., network entities). The functional elements may include, for example, a network slice selection function (NSSF) 410, a network exposure function (NEF) 415, an authentication server function (AUSF) 420, a UDM component 425, a PCF 430, an application function (AF) 435, an AMF 440, an SMF 445, and/or a UPF 450, among other examples. These functional elements may be communicatively connected via a message bus 455. Each of the functional elements shown in FIG. 4 may be implemented on one or more devices associated with a wireless telecommunications system. In some implementations, one or more of the functional elements may be implemented on physical devices, such as an access point, a base station, and/or a gateway, among other examples. In some implementations, one or more of the functional elements may be implemented on a computing device of a cloud computing environment.

The NSSF 410 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120. Network slicing may efficiently provide communications for different types of services with different service standards.

The NSSF 410 may determine a set of network slice policies to be applied at the wireless network 100. For example, the NSSF 410 may apply one or more UE route selection policy (URSP) rules. In some aspects, the NSSF 410 may select a network slice based on a mapping of a data network name (DNN) field included in a route selection description (RSD) to the DNN field included in a traffic descriptor selected by the UE 120. By providing network slicing, the NSSF 410 allows an operator to deploy multiple substantially independent end-to-end networks potentially with the same infrastructure. In some implementations, each slice may be customized for different services.

The NEF 415 may include one or more devices that support exposure of capabilities and/or events in the wireless telecommunications system to help other entities in the wireless telecommunications system discover network services. The AUSF 420 may include one or more devices that act as an authentication server and support the process of authenticating the UE 120 in the wireless telecommunications system.

The UDM 425 may include one or more devices that store user data and profiles in the wireless telecommunications system. In some aspects, the UDM 425 may be used for fixed access and/or mobile access, among other examples, in the core network 405.

The PCF 430 may include one or more devices that provide a policy framework that incorporates network slicing, roaming, packet processing, and/or mobility management, among other examples. In some aspects, the PCF 430 may include one or more URSP rules used by the NSSF 410 to select network slice instances for the UE 120.

The AF 435 may include one or more devices that support application influence on traffic routing, access to the NEF 415, and/or policy control, among other examples. The AMF 440 may include one or more devices that act as a termination point for non-access stratum (NAS) signaling and/or mobility management, among other examples. In some aspects, the AMF may request that the NSSF 410 select network slice instances for the UE 120 (e.g., at least partially in response to a request for data service from the UE 120).

The SMF 445 may include one or more devices that support the establishment, modification, and release of communication sessions in the wireless telecommunications system. For example, the SMF 445 may configure traffic steering policies at the UPF 450 and/or enforce UE IP address allocation and policies, among other examples. In some aspects, the SMF 445 may provision the network slice instances selected by the NSSF 410 for the UE 120.

The UPF 450 may include one or more devices that serve as an anchor point for intra-RAT and/or inter-RAT mobility. In some aspects, the UPF 450 may apply rules to packets, such as rules pertaining to packet routing, traffic reporting, and/or handling user plane quality of service (QoS), among other examples.

The message bus 455 may be a logical and/or physical communication structure for communication among the functional elements. Accordingly, the message bus 455 may permit communication between two or more functional elements, whether logically (e.g., using one or more application programming interfaces (APIs), among other examples) and/or physically (e.g., using one or more wired and/or wireless connections).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example 400 may perform one or more functions described as being performed by another set of devices of example environment 400.

As indicated above, FIG. 4 is provided as an example. Other examples may differ from what is described with regard to FIG. 4.

Figure 5:
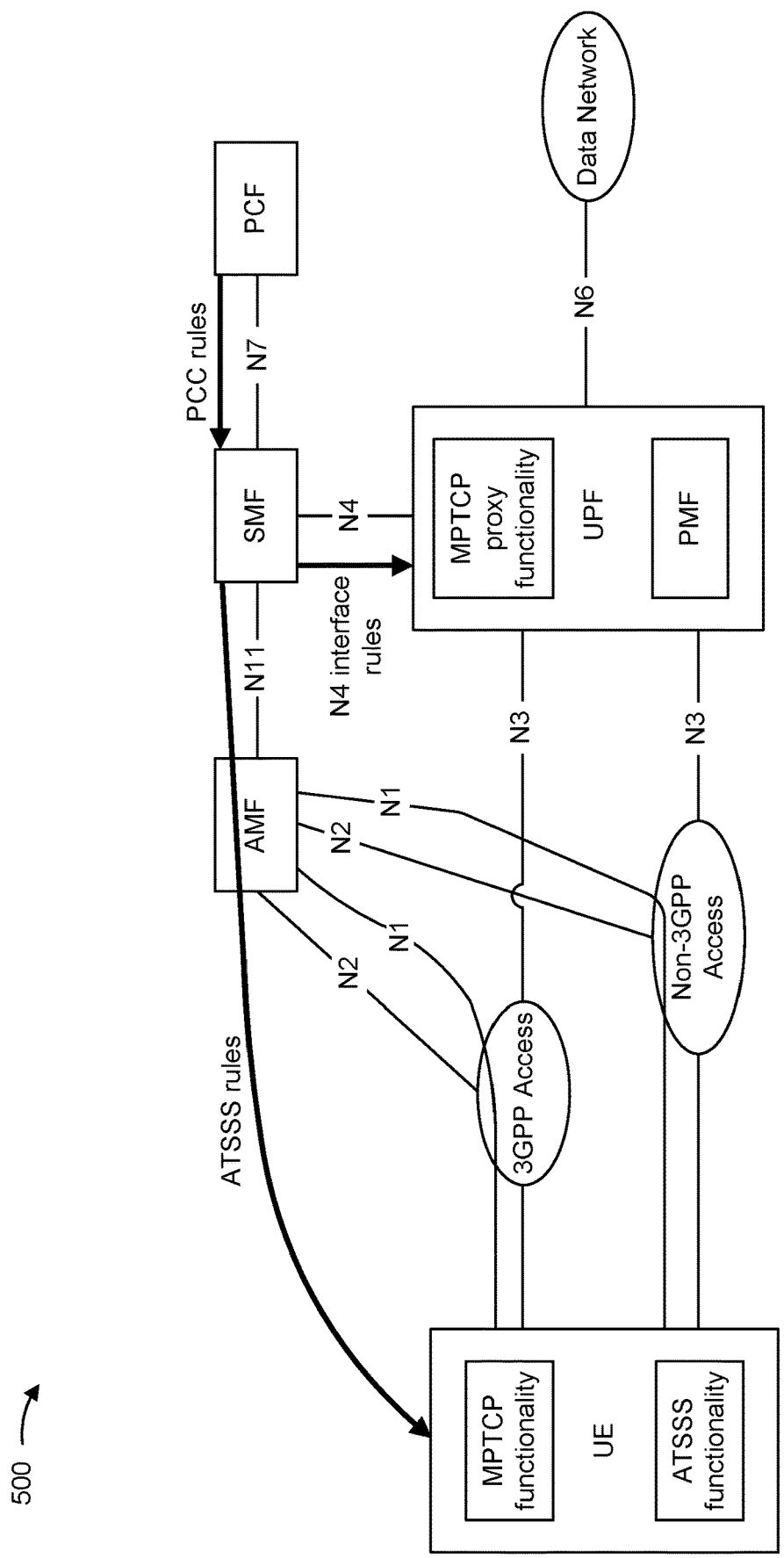
FIG. 5 is a diagram illustrating an example of an access traffic steering, switching, and splitting (ATSSS) network architecture, in accordance with the present disclosure.

FIG. 5 is a diagram illustrating an example 500 of an ATSSS network architecture, in accordance with the present disclosure. In general, as described herein, the ATSSS network architecture may integrate a 3GPP access (e.g., a 5G NR cellular access) with a non-3GPP access (e.g., a Wi-Fi and/or wireline access) to allow traffic steering across multiple accesses at a finer granularity than a PDU session. For example, as described in connection with FIG. 6, the ATSSS network architecture may support a multi-access (MA) PDU session, which may include downlink and/or uplink traffic that is served over one or more concurrent accesses (e.g., the 3GPP access, a trusted non-3GPP access, and/or an untrusted non-3GPP access). For example, in order to improve end user experience, the MA PDU session may be configured for steering such that traffic associated with the MA PDU session is served over either the 3GPP access or the non-3GPP access (e.g., to select the best network), for switching such that traffic associated with the MA PDU session is moved from the 3GPP access to the non-3GPP access or vice versa (e.g., to enable seamless handover), and/or for switching such that traffic associated with the MA PDU session is served concurrently over the 3GPP access and the non-3GPP access (e.g., to enable network aggregation).

Accordingly, as shown in FIG. 5, the ATSSS network architecture may enable a UE to use the 3GPP access and/or the non-3GPP access to access a data network via one or more devices in a 5G core network. For example, as shown in FIG. 5, an AMF may communicate with a UE over an N1 interface and may control one or more access paths with signaling over an N2 interface. Furthermore, as described herein, the ATSSS network architecture includes an integrated non-3GPP access. For example, as shown in FIG. 5, the 3GPP access and the non-3GPP access each have an N3 interface to enable communication with a UPF in the 5G core network, the 3GPP access and the non-3GPP access both provide transparent N1 interfaces from the UE to the AMF (e.g., to transfer UE information related to connection, mobility, and sessions in a manner that is transparent to the 3GPP access and/or the non-3GPP access), and the 3GPP access and the non-3GPP access each have an N2 interface that connects one or more network nodes to the AMF (e.g., to transfer control plane signaling between the AMF and the 3GPP access and/or the non-3GPP access). Furthermore, as shown, the ATSSS network architecture includes an SMF that may communicate with the UPF over an N4 interface, an N6 interface to enable communication between the UPF and the data network, a PCF that may communicate with the SMF over an N7 interface, and an N11 interface to enable communication between the AMF and the SMF.

As shown in in FIG. 5, the UE may support one or more steering functionalities (e.g., multipath transmission control protocol (MPTCP) functionality and/or ATSSS lower layer (ATSSS-LL) functionality) that enable traffic steering, switching, and splitting in an uplink direction across the 3GPP access and the non-3GPP access in accordance with ATSSS rules provided by the ATSSS network. Furthermore, the UPF may support MPTCP proxy functionality that communicates with the MPTCP functionality in the UE using the MPTCP protocol and/or may support ATSSS-LL functionality (not shown in FIG. 5) that is generally similar to the ATSSS-LL functionality defined for the UE. Accordingly, the UPF may configure traffic steering, switching, and splitting in a downlink direction across the 3GPP access and the non-3GPP access in accordance with N4 interface rules provided by the ATSSS network. For example, as shown in FIG. 5, the PCF may provide policy and charging control (PCC) rules that include control information associated with an MA PDU session requested by a UE to the SMF, which in turn provides the ATSSS rules to the UE and the N4 interface rules to the UPF. For example, the PCF may transmit the PCC rules to the SMF over the N7 interface, and the SMF may then derive the ATSSS rules and the N4 interface rules from the PCC rules received from the PCF. The SMF may then send the ATSSS rules to the UE via the AMF (e.g., the SMF may transmit the ATSSS rules to the AMF over the N11 interface, and the AMF may then transmit the ATSSS rules to the UE over the N1 interface) and the SMF may send the N4 interface rules to the UPF over the N4 interface. In addition, the UPF may support performance measurement functionality (PMF), which the UE may use to obtain access performance measurements over a user plane of the 3GPP access and/or a user plane of the non-3GPP access. For example, the PMF in the UPF may configure a steering mode for uplink and/or downlink traffic transferred over the 3GPP and/or non-3GPP access (e.g., an active standby steering mode, a smallest delay steering mode, a load balancing steering mode, and/or a priority-based steering mode, among other examples).

As indicated above, FIG. 5 is provided as an example. Other examples may differ from what is described with regard to FIG. 5.

Figure 6:
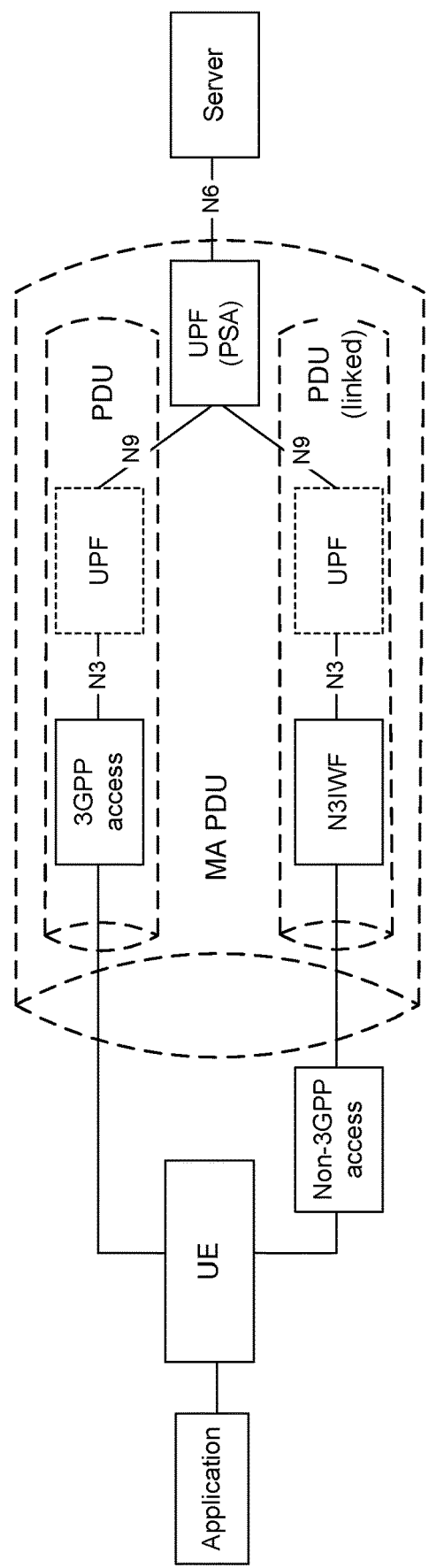
FIG. 6 is a diagram illustrating an example of a multi-access protocol data unit (PDU) session in an ATSSS network architecture, in accordance with the present disclosure.

FIG. 6 is a diagram illustrating an example 600 of an MA PDU session in an ATSSS network architecture, in accordance with the present disclosure. For example, as shown in FIG. 6, the ATSSS network architecture may generally enable an MA PDU connectivity service that can be used to exchange one or more PDUs between a data network and an application running on a UE using a 3GPP access network and an integrated non-3GPP access network (e.g., Wi-Fi) and two independent N3/N9 tunnels between a UPF PDU session anchor (PSA) and the respective access networks.

As shown in example 600, the MA PDU connectivity service may be realized by establishing an MA PDU session that may have user plane resources on two access networks. For example, in some aspects, the UE may request an MA PDU session when the UE is registered via both the 3GPP access and the non-3GPP access, or when the UE is registered via one access only. After the MA PDU session is established, and when there are user plane resources on both the 3GPP access and the non-3GPP access, the UE may apply a network-provided policy (e.g., ATSSS rules) and/or consider local conditions (e.g., network interface availability, signal loss conditions, user preferences, or the like) to decide how to distribute uplink traffic across the two access networks. Similarly, the UPF PSA may apply a network-provided policy (e.g., N4 interface rules) and/or feedback information received from the UE via the user plane (e.g., access network unavailability or availability) to decide how to distribute downlink traffic across the two independent N3/N9 tunnels and the two access networks. When there are user plane resources on only one access network, the UE may apply the ATSSS rules and consider local conditions to trigger the establishment or activation of the user plane resources over another access.

As described herein, the MA PDU session relies upon an integrated non-3GPP access, which requires a non-3GPP interworking function (N3IWF) to provide an interface between the non-3GPP access network and core network devices. For example, the N3IWF is used to support IP security (IPsec) tunnel establishment with the UE (e.g., terminating internet key exchange (IKE) and/or IPsec protocols with the UE over an NWu interface and relaying information over an N2 interface to authenticate the UE and authorize the UE to access the core network). In addition, the N3IWF is used to terminate N2 and N3 interfaces to the core network for control plane traffic and user plane traffic, relay uplink and downlink control plane non-access stratum (NAS) signaling between the UE and an AMF via an N1 interface, handle N2 signaling from an SMF (relayed by an AMF) related to PDU sessions and quality of service (QoS), and/or relay uplink and downlink user plane packets between the UE and UPF (e.g., by encapsulating and/or decapsulating packets for IPsec and N3 tunnelling), among other examples. However, the need to deploy the N3IWF poses various practical challenges, including significant complexity to support control plane signaling between the non-3GPP access and the AMF in the core network and/or the need to establish encryption between the UE and the N3IWF. For example, the encryption or IPsec tunnel establishment is generally dependent on how much traffic is being routed to or from the core network, whereby existing ATSSS network architectures limit 3GPP and non-3GPP concurrency to voice communication only (e.g., all other applications always use Wi-Fi when available) because voice communication typically has small traffic requirements. If a network operator were to deploy an N3IWF for general internet access, the network operator would face hardware capacity issues because traffic volumes would grow by several orders of magnitude (e.g., from 20-50 kilobits per second (Kbps) per UE for voice over Wi-Fi (VoWiFi) to potentially hundreds of megabits per second (Mbps) for internet traffic).

Accordingly, because there are various practical considerations that have limited or prevented network operators from deploying full-featured ATSSS network architectures, some aspects described herein relate to one or more network architectures that may support non-integrated traffic aggregation, steering, and switching for a PDU session. For example, some aspects described herein relate to one or more network architectures that may support traffic aggregation, steering, and switching between a 3GPP access and a non-integrated IP network (e.g., non-integrated Wi-Fi). As described in further detail herein, the one or more network architectures (which may be referred to as ATSSS-Lite or other suitable terminology) may avoid a need to deploy an N3IWF to support integration between a 3GPP access and a non-3GPP access, may achieve at least some of the objectives of ATSSS network architectures (e.g., traffic aggregation), and/or may enable initial deployment of ATSSS features with fewer practical hurdles than a full-featured ATSSS network architecture to facilitate a path toward eventual deployment of the full-featured ATSSS network architectures.

As indicated above, FIG. 6 is provided as an example. Other examples may differ from what is described with regard to FIG. 6.

Figure 7A:
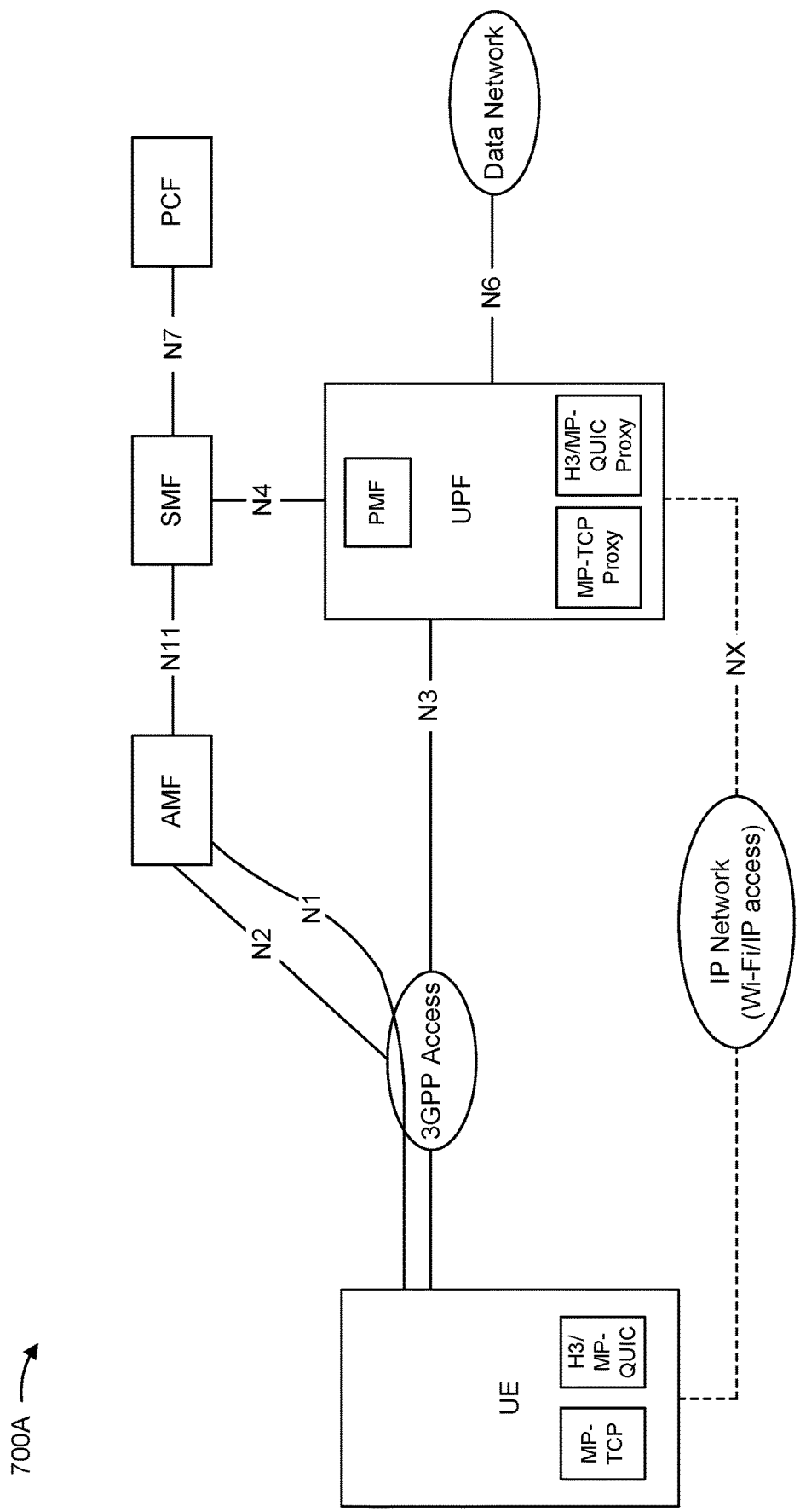
FIGS. 7A-7B are diagrams illustrating examples associated with network architectures that support non-integrated traffic aggregation, steering, and switching for a PDU session, in accordance with the present disclosure.
Figure 7B:
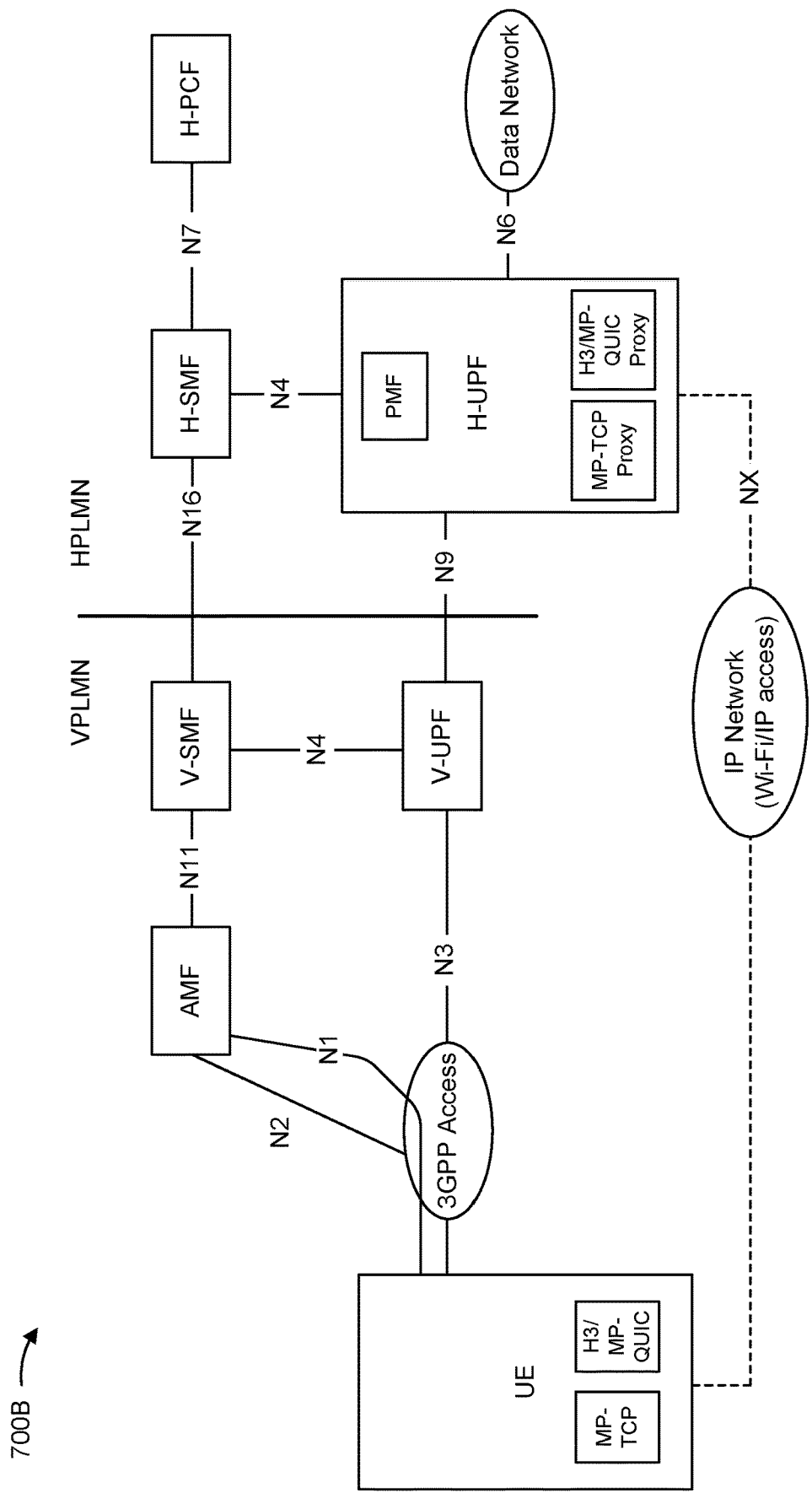

FIGS. 7A-7B are diagrams illustrating examples 700A, 700B associated with network architectures that support non-integrated traffic aggregation, steering, and switching for a PDU session, in accordance with the present disclosure. For example, as described herein, FIG. 7A illustrates an example 700A of a non-roaming network architecture that supports traffic aggregation, steering, and switching for a PDU session across a 3GPP access and a non-integrated IP network (e.g., a generic IP access, such as Wi-Fi or another IP access available to the UE), and FIG. 7B illustrates an example 700B of a roaming network architecture that supports traffic aggregation, steering, and switching for a PDU session across a 3GPP access and a non-integrated IP network.

For example, as shown in FIG. 7A, a UE in a non-roaming scenario may access a data network connected to a UPF via a 3GPP access, where the 3GPP access provides an N1 interface to enable communication between the UE and an AMF and the 3GPP access also terminates an N2 interface used to communicate control signaling between the 3GPP access and the AMF. In the non-roaming scenario shown in FIG. 7A, the UPF communicates with the data network over an N6 interface, communicates with the UE via the 3GPP access over an N3 interface, and communicates with the UE via the non-integrated IP network over an NX interface. Furthermore, as shown, the non-roaming network architecture includes an SMF that may communicate with the UPF over an N4 interface, a PCF that may communicate with the SMF over an N7 interface, and an N11 interface to enable communication between the AMF and the SMF.

Accordingly, as shown in FIG. 7A, the UE may access one or more proxies in the UPF using the N3 interface associated with the 3GPP access and/or using the NX interface associated with the non-integrated IP network. For example, in some aspects, the one or more proxies in the UPF may include an MPTCP proxy, which has two IP addresses to communicate with MPTCP functionality in the UE (e.g., a first IP address to communicate with the MPTCP functionality in the UE via the 3GPP access over the N3 interface and a second IP address to communicate with the MPTCP functionality in the UE via the IP network over the NX interface. Additionally, or alternatively, the one or more proxies in the UPF may include one or more Multiplexed Application Substrate over Quick User Datagram Protocol (UDP) Internet Connections (QUIC) Encryption (MASQUE) Hypertext Transfer Protocol 3 (H3) proxies. For example, the MASQUE H3 proxies may include an IP over H3 proxy that enables IP tunneling using a CONNECT-ip protocol and/or a UDP over H3 proxy that enables UDP tunneling using a CONNECT-udp protocol, where the IP over H3 proxy and the UDP over H3 proxy both provide security using a Multipath QUIC (MPQUIC) protocol. In the non-roaming network architecture shown in FIG. 7A, the IP network does not include an N1 interface or an N2 interface, whereby the IP network is non-integrated with respect to the 3GPP access (e.g., no control plane traffic is transferred over the IP network). Accordingly, in contrast to an MA PDU session that requires an N3IWF in a full-featured ATSSS architecture, the non-roaming network architecture shown in FIG. 7A may enable a non-integrated aggregation (NIA) PDU session in which downlink and/or uplink user plane traffic is steered, switched, and/or split across the 3GPP access via the N3 interface and/or the non-integrated IP network via the NX interface.

Additionally, or alternatively, FIG. 7B illustrates an example 700B of a roaming architecture that may support traffic steering, switching, and splitting across a 3GPP access and a non-integrated IP network. For example, as shown in FIG. 7B, a UE in a roaming scenario may access a data network connected to a home UPF (H-UPF) in a home public land mobile network (HPLMN) via a 3GPP access, where the 3GPP access provides an N1 interface to enable communication between the UE and an AMF and the 3GPP access also terminates an N2 interface used to communicate control signaling between the 3GPP access and the AMF. In the roaming scenario shown in FIG. 7B, the H-UPF communicates with the data network over an N6 interface, and communicates with a visited UPF (V-UPF) in a visited public land mobile network (VPLMN) over an N9 interface. Accordingly, downlink and/or uplink traffic transferred over the 3GPP access is communicated between the UE and the V-UPF over an N3 interface, between the V-UPF and the H-UPF over the N9 interface, and between the H-UPF and the data network over the N6 interface. As further shown, downlink and/or uplink traffic transferred over the non-integrated IP access is communicated between the UE and the H-UPF over the NX interface. Furthermore, as shown, the roaming network architecture includes a visited SMF (V-SMF) and a home SMF (H-SMF) that may respectively communicate with the V-UPF and H-UPF over respective N4 interfaces, a home PCF (H-PCF) that may communicate with the H-SMF over an N7 interface, an N11 interface to enable communication between the AMF and the V-SMF, and an N16 interface to enable communication between the V-SMF and the H-SMF.

In some aspects, as described herein, the UE may support one or more steering functionalities or proxy types, which may include an MPTCP steering functionality or proxy type and/or one or more MASQUE or H3/MPQUIC steering functionalities or proxy types (e.g., IP over H3 and/or UDP over H3), and corresponding proxies at the UPF may each have two IP addresses (e.g., in contrast to one IP address in an ATSSS network architecture that includes a 3GPP access and an integrated non-3GPP access, as described above in connection with FIG. 5 and FIG. 6). In particular, the one or more proxies at the UPF may each include a first IP address to enable access via a core network associated with the 3GPP access over the N3 interface and a second IP address to enable access via a non-integrated non-3GPP IP network over the NX interface. In cases where the UE accesses an MPTCP proxy in the UPF, the access may be via multi-address MPTCP and both IP addresses (e.g., for the N3 and NX interfaces) may be provided to the UE. For example, the multi-address MPTCP proxy may use a Zero Round Trip Time (0-RTT) TCP Convert Protocol proxy type, which has little to no performance overhead, and the MPTCP proxy may be secured over the NX interface.

Alternatively, in cases where the UE accesses a MASQUE proxy in the UPF (also referred to as H3 over MPQUIC or H3/MPQUIC), the H3 proxy in the UPF may be sent an N3 proxy address only, and a corresponding proxy stack may use respective IP addresses for the 3GPP access and the non-integrated IP network. For example, the IP over H3 version of the MASQUE proxy may use the CONNECT-ip protocol to enable IP tunneling and the UDP over H3 version of the MASQUE proxy may use the CONNECT-udp protocol to enable UDP tunneling. In either case, the proxy stack may include an IP layer at a lowest level, a UDP layer above the IP layer, an MPQUIC layer above the UDP layer, and an H3 layer above the MPQUIC layer. The proxy stacks associated with the IP over H3 and UDP over H3 versions of the MASQUE protocol may differ in that the proxy stack associated with the IP over H3 proxy type includes a second IP layer above the H3 layer and a TCP/UDP layer above the second IP layer (e.g., to re-encapsulate a complete IP payload), whereas the proxy stack associated with the UDP over H3 proxy type includes only a UDP layer above the H3 layer.

In some aspects, in cases where the UE uses a MASQUE or H3/MPQUIC steering functionality to communicate with a MASQUE or H3/MPQUIC proxy at the UPF, there may be no need to secure downlink and/or uplink traffic transferred over the NX interface because MPQUIC provides built-in security functionality. However, in cases where the UE uses an MPTCP steering functionality to communicate with an MPTCP proxy at the UPF over the non-integrated IP network, downlink and/or uplink traffic transferred over the NX interface may need to be secured because MPTCP does not have built-in security. For example, in some aspects, security for MPTCP traffic transferred over the NX interface may be implemented using one or more technologies that support securing TCP traffic over IP networks. For example, in some aspects, MPTCP traffic communicated over the NX interface may be secured using transport layer security (TLS), which may be enforced at a high-level operating system (HLOS) layer (e.g., below an application layer).

Furthermore, in some aspects, one or more techniques may be used to secure the MPTCP proxy server on the NX interface to provide protection against unauthorized third party MPTCP traffic accessing and/or misusing an unprotected MPTCP proxy over the NX interface. For example, in a first use case, the MPTCP proxy server may allow only synchronize (SYN) packets that include a multipath capable (MP_CAPABLE) parameter over the N3 interface, and may allow only traffic that includes a multipath join (MP_JOIN) parameter over the NX interface. As a result, the MPTCP proxy may disallow new MPTCP connections over the NX interface and may allow only new sub-flows over the NX interface. Alternatively, in a second use case, the MPTCP proxy server may allow only MP_CAPABLE SYN packets over the N3 interface, and may disallow SYN and MP_JOIN packets over the NX interface. In the second use case, the UE may send an IP address of the UE on the NX interface to the MPTCP proxy in the UPF via an add address (ADD_ADDR) parameter communicated over the N3 interface, and the MPTCP proxy in the UPF may then add a new sub-path for the IP address of the UE on the NX interface. In this case, the MPTCP proxy rejects all sub-path requests over the NX interface, and is therefore better protected than in the first use case where new sub-flows may be established over the NX interface.

In general, the MPTCP proxy type and the MASQUE proxy types (e.g., IP over H3 and UDP over H3) may be associated with various tradeoffs, which may impact whether a UE supports a particular proxy type and/or whether a network architecture that supports an NIA PDU session includes a UPF that supports the MPTCP proxy type and/or one or more MASQUE proxy types. For example, the MPTCP proxy is generally an older and more mature protocol relative to the MASQUE proxies, and there are existing open source and/or operating system implementations of the MPTCP proxy type (e.g., in comparison to the MASQUE proxies, where open source user space implementations are under development and the architecture requires porting to an operating system). In addition, the MPTCP proxy is a higher-layer protocol with no overhead, whereas the MASQUE proxies are associated with at least some overhead that may lead to maximum transmission unit (MTU) issues (e.g., reducing the size of the largest PDU that can be communicated in one network layer transaction). On the other hand, the MASQUE proxies may include IP over H3 (also referred to as CONNECT-ip) to support both TCP and UDP traffic as well as UDP over H3 (also referred to as CONNECT-udp) to support UDP traffic, whereas the MPTCP proxy only supports TCP or HTTP traffic. Furthermore, as described above, the MASQUE proxies offer built-in security functionality via the QUIC protocol and/or the MPQUIC protocol, whereas security that relies on TLS needs to be implemented for the MPTCP proxy that otherwise lacks built-in security functionality.

In some aspects, the network architectures depicted in FIGS. 7A-7B may support traffic aggregation across the 3GPP access and the non-integrated IP network per-application and/or per-PDU session. For example, traffic aggregation across the 3GPP access and the non-integrated IP network may be supported per-application using an aggregation-based non-seamless offload (NSO) URSP indication. For example, existing URSP rules support an NSO indication that may indicate whether traffic associated with a matching application is to be offloaded to a non-3GPP access outside a PDU session. Accordingly, to enable aggregation across the 3GPP access and the non-integrated IP network, the URSP rules may be extended to include an NSO with aggregation indication, which enables a per-application and/or per-traffic descriptor granularity (e.g., indicating that x percent of traffic associated with a particular application or traffic descriptor is be routed over the 3GPP access and that 100-x percent of the traffic associated with the application or traffic descriptor is be routed over the non-integrated IP network in a load balancing steering mode).

Alternatively, traffic aggregation across the 3GPP access and the non-integrated IP network may be supported per-PDU session using an aggregation-based access type URSP indication. For example, existing URSP rules support an access type preference indication that may indicate a preferred access type (e.g., 3GPP access, non-3GPP access, or multi-access) when the UE establishes a PDU session for a matching application. Accordingly, to enable aggregation across the 3GPP access and the non-integrated IP network per-PDU session, the URSP rules may be extended to include a non-integrated aggregation (NIA) access type (e.g., "NIA PDU Session"), which may be used to handle traffic during a PDU session lifetime. In this way, the NIA access type may enable a per-PDU session granularity, and may enable an existing ATSSS signaling framework to be reused for NIA PDU sessions (e.g., as described in further detail below with reference to FIGS. 8A-8B). Furthermore, the NIA access type indication may enable various steering modes per PDU session, including a load balancing steering mode (e.g., splitting a service data flow (SDF) across both the 3GPP access and the IP network if both are available), an active standby steering mode (e.g., steering an SDF on an active access if available and otherwise switching the SDF to a standby access if unavailable), a smallest delay steering mode (e.g., steering an SDF to an access with a smallest RTT), a priority-based steering mode (e.g., steering all traffic of an SDF to a high priority access until the high-priority access is determined to be congested), and/or a redundant steering mode (e.g., fully or partially duplicating PDUs over the 3GPP access and the non-integrated IP network), among other examples.

Accordingly, in comparison to an ATSSS network architecture, ATSSS-Lite network architectures (e.g., as shown in FIG. 7A in a non-roaming scenario or in FIG. 7B in a roaming scenario) may eliminate N1 and N2 interfaces between the AMF and the non-integrated IP network, and may provide an NX interface rather than an N3 interface between the UPF and the non-integrated IP network. In general, because there is no N1 interface or N2 interface, the ATSSS-Lite network architectures described herein may lack QoS support or have minimal QoS support over the non-integrated IP network (e.g., the ATSSS-Lite network architectures may be best suited to non-guaranteed bit rate (non-GBR) applications). Furthermore, although PMF measurements can be obtained on both the 3GPP access and the non-integrated IP network, there is no PMF protocol implemented for non-integrated IP networks (e.g., the PMF protocol only works on the 3GPP access). Accordingly, in some aspects, PMF measurements in an ATSSS-Lite network architecture may be reported only via the 3GPP access, although the reported PMF measurements may include PMF measurements of the non-integrated IP network in addition to PMF measurements of the 3GPP access. Furthermore, because there is no control plane signaling between the non-integrated IP network and the AMF or other core network devices, all registration messages may be signaled over the 3GPP access, there may be no access mobility (e.g., 3GPP access to and/or from the IP network), and an NIA PDU session may be lost if the 3GPP access is lost.

As indicated above, FIGS. 7A-7B are provided as examples. Other examples may differ from what is described with regard to FIGS. 7A-7B.

Figure 8A:
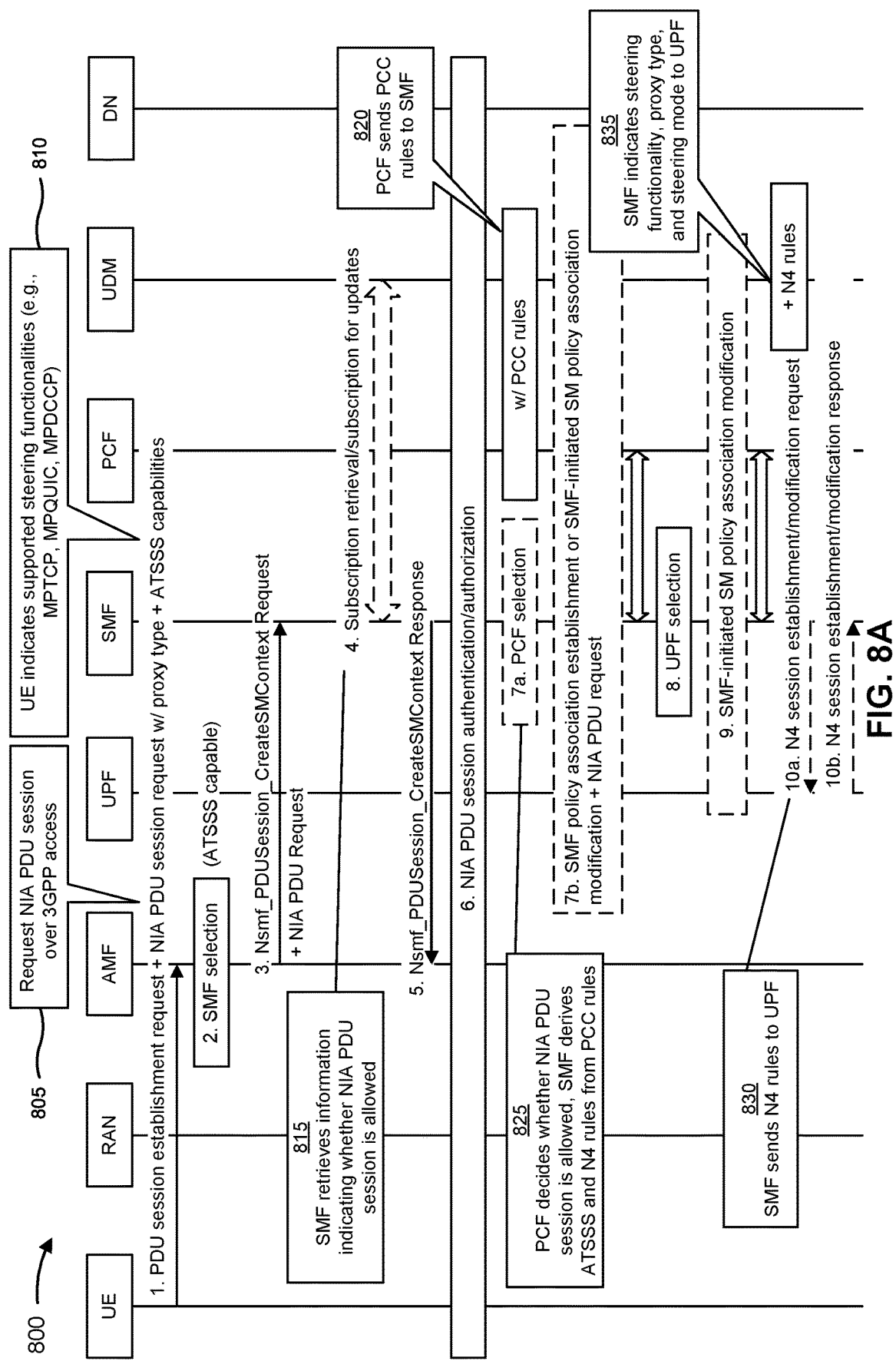
FIGS. 8A-8B are diagrams illustrating an example associated with a signaling flow for establishing a non-integrated aggregation (NIA) PDU session, in accordance with the present disclosure.
Figure 8B:
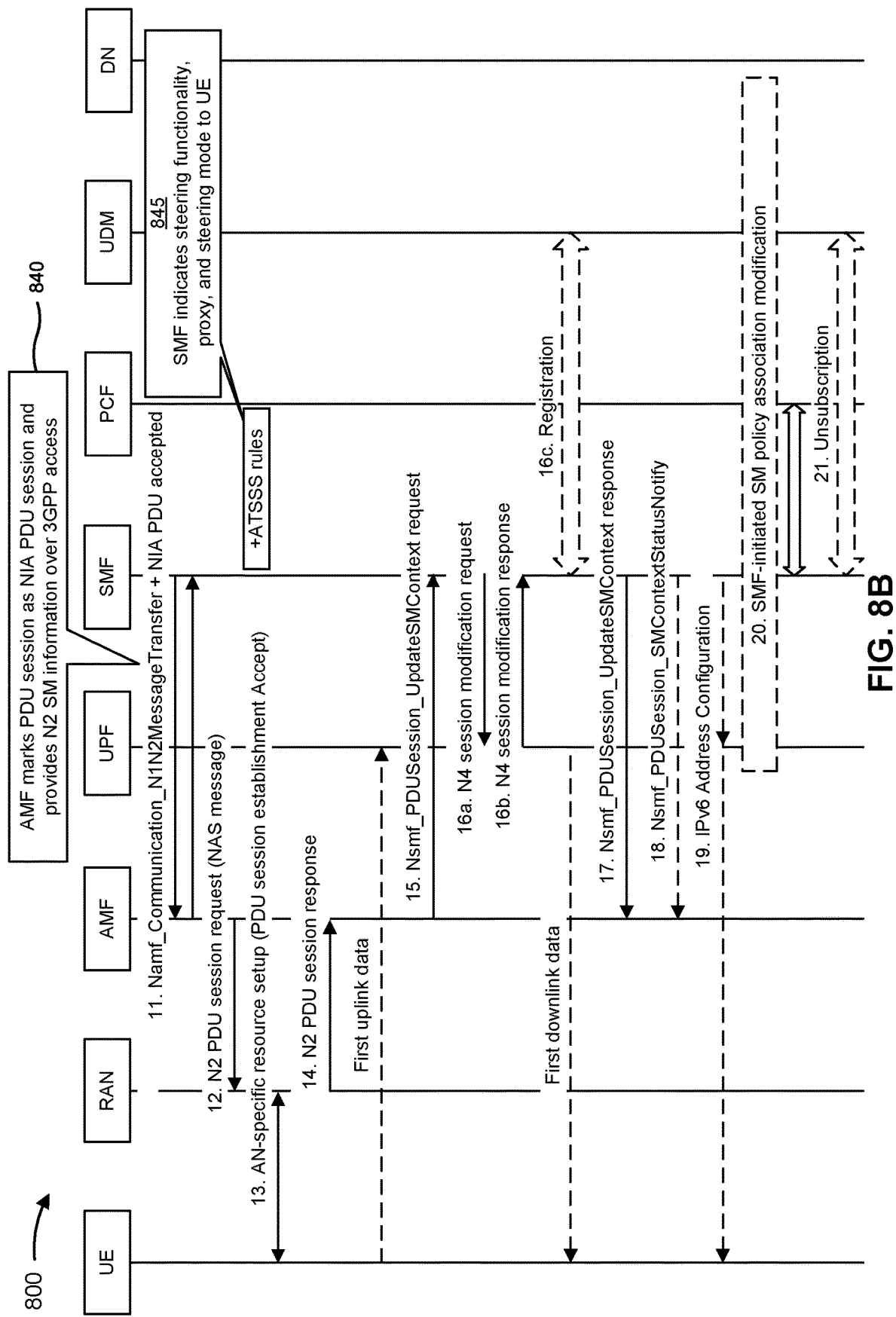

FIGS. 8A-8B are diagrams illustrating an example 800 associated with a signaling flow for establishing an NIA PDU session, in accordance with the present disclosure. As shown in FIG. 8, example 800 includes communication between a UE (e.g., UE 120), one or more network nodes provided in a RAN (e.g., a CU, a DU, an RU, a gNB, or another suitable network node), a data network (shown as DN), and various core network devices (e.g., an AMF, a UPF, an SMF, a PCF, and a UDM). In some aspects, the UE, the one or more network nodes, and the one or more core network devices may communicate in an ATSSS-Lite network architecture, such as the non-roaming network architecture shown in FIG. 7A and/or the roaming network architecture shown in FIG. 7B). The UE and the one or more network nodes provided in the RAN may communicate via a wireless access link associated with a 3GPP access, which may include an uplink and a downlink. Furthermore, in some aspects, the UE may be connected to a non-integrated IP network (not shown in FIGS. 8A-8B).

In some aspects, as described herein, example 800 depicts a signaling flow including multiple steps that may be used to establish an NIA PDU session that enables steering, switching, and/or splitting downlink and/or uplink user plane traffic across a 3GPP access and a non-integrated IP network (e.g., Wi-Fi). For example, as described herein, an NIA PDU session may include a PDU session associated with an N3/N9 tunnel between the UE and a PDU session anchor (PSA) (e.g., the UPF) (e.g., over the 3GPP access) and an NX tunnel between the UE and the PSA (e.g., over the non-integrated IP network). The user plane traffic of an NIA PDU session can be transferred over the 3GPP access, over the non-integrated IP network, or over both the 3GPP access and the non-integrated IP network, and control plane traffic associated with the NIA PDU session may be transferred over the 3GPP access only (e.g., because the non-integrated IP network does not have an N1 or N2 interface to transfer control plane traffic). In general, the signaling flow shown in FIGS. 8A-8B may be used when the UE is not roaming, or when the UE is roaming and the PSA is located in a VPLMN.

As shown in FIG. 8A, in step 1, the UE may transmit a PDU session establishment request to the AMF. For example, in order to establish a new NIA PDU session, the UE may generate a new PDU session identifier, and may transmit an uplink NAS message (e.g., a PDU session establishment request message) that contains the PDU session identifier and a request type associated with the NIA PDU session. In general, as shown by reference number 805, the UE sends the request to establish the NIA PDU session over the 3GPP access (e.g., because control plane signaling cannot be sent over the non-integrated IP network). Furthermore, as shown by reference number 810, the request type included in the PDU session establishment request message may indicate that the request is for an NIA PDU session (e.g., using an NIA access type or NIA access type preference associated with a URSP rule), and the PDU session establishment request message may also indicate one or more ATSSS capabilities of the UE. For example, in some aspects, the ATSSS capabilities may include one or more proxy types that the UE supports using to steer traffic associated with the NIA PDU session. For example, the PDU session establishment request may include an ATSSS request protocol configuration options (PCO) parameter with a field to indicate the proxy types supported by the UE (e.g., the field may include various bits that are set to a first value to indicate that the UE supports MPTCP aggregation functionality, a second value to indicate that the UE supports UDP aggregation over H3, a third value to indicate that the UE supports UDP and IP aggregation over H3, a fourth value to indicate that the UE supports MTCP aggregation and UDP and IP aggregation over H3, or the like. Additionally, or alternatively, in cases where the UPF supports a multipath datagram congestion control protocol (MPDCCP), the value of the ATSSS request PCO parameter may indicate whether the UE supports an MPDCCP proxy type.

As further shown in FIG. 8A, in step 2, the AMF may select an SMF that supports NIA PDU sessions based on the NIA PDU access type indicated in the URSP rule associated with the PDU session establishment request. In step 3, the AMF may send a PDU session create context request to the SMF. In some aspects, the PDU session create context request sent to the SMF may include an NIA PDU session request associated with the NIA PDU access type indication provided by the UE. For example, the AMF may inform the SMF that the PDU session establishment request is for an NIA PDU session by including an NIA PDU request indication in the PDU session create context request sent to the SMF. As further shown in FIG. 8A, in step 4, the SMF may retrieve or update subscription information with the UDM. For example, as shown by reference number 815, the SMF may retrieve session management subscription data that indicates whether the NIA PDU session is allowed for the UE. In step 5, the SMF may send, to the AMF, a response to the PDU session create context request. For example, if the SMF is able to process the NIA PDU session establishment request (e.g., based on the subscription data retrieved from the UDM indicating that the NIA PDU session is allowed), the SMF may create a context for the NIA PDU session and respond to the AMF by providing an identifier of the context for the NIA PDU session. As further shown in FIG. 6, in step 6, optional secondary authentication and/or authorization may be performed for the NIA PDU session.

As further shown in FIG. 8A, the SMF may select a PCF in step 7a, and may perform policy association establishment or modification in step 7b. For example, if dynamic PCC is to be used for the NIA PDU session, the SMF may send an NIA PDU request to the select PCF in a session management (SM) policy control create message that also indicates the ATSSS capabilities associated with the NIA PDU session (e.g., the one or more proxy types supported by the UE). In this case, the PCF may decide whether the NIA PDU session is allowed based on operator policy and subscription data. Furthermore, as shown by reference number 820, the PCF sends PCC rules that include NIA PDU session control information to the SMF. Accordingly, as shown by reference number 825, the SMF may use the PCC rules provided by the PCF to derive ATSSS rules that will be sent to the UE to control traffic steering, switching, and splitting for the NIA PDU session in an uplink direction, and the SMF may also use the PCC rules provided by the PCF to derive N4 interface rules that will be sent to the UPF to control traffic steering, switching, and splitting for the NIA PDU session in a downlink direction. In step 8, the SMF may select a UPF for the NIA PDU session (e.g., a UPF including a proxy that corresponds to a proxy type supported by the UE, such as an MPTCP proxy type or one or more MASQUE proxy types). In step 9, the SMF may initiate an SM policy association modification (e.g., to provide information on one or more policy control request trigger conditions that have been met).

As further shown in FIG. 8A, in steps 10a-10b, the SMF and the UPF may communicate to establish or modify an N4 session associated with the NIA PDU session. For example, as shown by reference number 830, the SMF may send the N4 interface rules derived for the NIA PDU session from the PCC rules to the UPF, which may allocate N3 uplink core network tunnel information to the NIA PDU session. Furthermore, as shown by reference number 835, the SMF may instruct the UPF as to which steering functionality, proxy type, and steering mode to activate for the NIA PDU session. In some aspects, in step 10a, the UPF may allocate addressing information for the PMF in the UPF. Furthermore, in cases where the SMF provides the UPF with a list of QoS flows over which access performance measurements may be performed, the UPF may allocate different UDP ports or different MAC addresses per QoS flow per access. In step 10b, the UPF may send the addressing information for the PMF to the SMF. For example, if UDP ports or MAC addresses are allocated per QoS flow and per access, the UPF may send the PMF IP address information and UDP ports with the related QoS flow identifier (QFI) to the SMF in the case of IP PDU sessions and/or may send the MAC addresses with the related QFI to the SMF in the case of Ethernet PDU sessions.

FIG. 8B shows a continuation of the NIA PDU session establishment procedure, where an AMF message transfer may be performed in step 11 to indicate that the request to establish the NIA PDU session was accepted. For example, in some aspects, the SMF may include an NIA PDU session accepted indication in an N1/N2 message transfer message sent to the AMF. As shown by reference number 840, the AMF may then mark the PDU session as an NIA PDU session based on the NIA PDU session accepted indication and provide N2 SM information over the 3GPP access. As further shown in FIG. 8B, in steps 12-14, the NIA PDU session may be established. For example, as shown by reference number 845, the SMF may send the ATSSS rules derived from the PCC rules to the AMF (e.g., in the N1/N2 message transfer message), and the AMF may send an N2 PDU session request message that includes the ATSSS rules to the 3GPP access. The UE may then communicate with one or more network nodes in the RAN to perform an access network-specific resource setup in step 13, and the one or more network nodes in the RAN may send an N2 PDU session response to the AMF in step 14. For example, in step 13, the UE may receive a PDU session establishment accept message indicating that the requested NIA PDU session was successfully established, and the PDU session establishment accept message may include the ATSSS rules that the SMF derived for the NIA PDU session. For example, the ATSSS rules may indicate which steering functionality, proxy, and steering mode the UE is to use to send traffic in an uplink direction. Furthermore, in cases where MPTCP functionality is supported for the NIA PDU session, the SMF may include the MPTCP proxy information in the ATSSS rules.

For example, in step 13, the UE may receive an ATSSS NIA response PCO parameter that provides network parameters for managing the NIA PDU session. For example, the ATSSS NIA response PCO parameter may include a proxy IP address type field that indicates whether a proxy IP address is an IP version 4 (IPv4) address, an IP version 6 (IPv6) address, or an IPv4v6 (dual stack) address. Furthermore, the ATSSS NIA response PCO parameter may include a proxy IP address field, which may contain an IPv4 address in four octets if the proxy IP address type field indicates IPv4, an IPv6 address in sixteen octets if the proxy IP address type field indicates IPv6, or two IP addresses if the proxy IP address type field indicates IPv4v6 (e.g., an IPv4 address in four octets and an IPv6 address in sixteen octets). Furthermore, the ATSSS NIA response PCO parameter may include a proxy port per access type and a proxy type field (e.g., indicating whether the proxy type for the NIA PDU session is an MPTCP proxy, a UDP over H3 proxy, or an IP over H3 proxy). In some aspects, the ATSSS NIA response PCO parameter may also include other suitable information for managing the NIA PDU session, such as an offload percentage that has a value between zero (0) and one-hundred (100) to indicate a percentage of traffic to be offloaded to a non-integrated IP network. In general, when the UE receives the ATSSS NIA response PCO parameter, the UE may determine that any values in the ATSSS rules provided by the SMF that relate to a non-3GPP access are to apply to the non-integrated IP network.

Furthermore, in some aspects, the UE may be configured with an information element (IE) that indicates address information associated with the proxy for non-integrated Wi-Fi aggregation at the UPF. For example, the UPF proxy address information IE may include a V4 bit that may be set to one (1) to indicate that a proxy IPv4 address field is present in the UPF proxy address information IE and a V6 bit that may be set to one (1) to indicate that a proxy IPv6 address field is present in the UPF proxy address information IE. Furthermore, the UPF proxy address information IE may include a series of octets to indicate respective proxy ports associated with the N3 interface and the NX interface, respective proxy IP addresses associated with the N3 and NX interfaces, and a proxy type (e.g., MPTCP, UDP over H3, or IP over H3).

As further shown in FIG. 8B, the remaining steps 15-21 may be used to transfer uplink and/or downlink traffic associated with the NIA PDU session. For example, the first uplink data may be sent from the UE to the UPF over the 3GPP access and/or the non-integrated IP network after the UE has been provided with the applicable ATSSS rules indicating the steering functionality, proxy information, and steering mode for the NIA PDU session. In step 15, the AMF may send a request to update an SM context associated with the NIA PDU session to the SMF, where the AMF forwards N2 SM information received from the RAN (or 3GPP access) to the SMF. In step 16a, the SMF may initiate an N4 session modification procedure with the UPF by providing access network tunnel information to the UPF and the corresponding forwarding rules. In step 16b, the UPF may provide an N4 session modification response to the SMF. In cases where multiple UPFs are used in the NIA PDU session, the N4 session modification response may refer to the UPF terminating the N3 interface. After step 16b, the UPF may deliver any downlink packets to the UE that may have been buffered for the NIA PDU session. In step 16c, the SMF may register with the UDM in cases where the SMF has not already registered for the NIA PDU session. As a result, the UDM stores various information associated with the NIA PDU session. In step 17, the SMF may send a response message to the AMF (e.g., to subscribe to UE mobility event notifications from the AMF). After step 17, the AMF may forward information related to any relevant events to which the SMF has subscribed.

In some aspects, in step 18, the SMF may inform the AMF if the NIA PDU session establishment is not successful at any time during the NIA PDU session establishment procedure. In such cases, the SMF also releases any N4 sessions that have been created, releases any NIA PDU session addresses that were allocated (e.g., IP addresses) and releases the association with the PCF, if any. In this case, step 19 is skipped. Otherwise, in step 19, the SMF generates an IPv6 router advertisement in the case of an IPv6 or IPv4v6 NIA PDU session type and the IPv6 router advertisement to the UE. In step 20, the SMF may initiate SM policy association modification with the UPF, PCF, and/or UDM, and in step 21, may unsubscribe from modifications of session management subscription data for the NIA PDU session if the NIA PDU session establishment failed after step 4.

As indicated above, FIGS. 8A-8B are provided as an example. Other examples may differ from what is described with regard to FIGS. 8A-8B.

Figure 9:
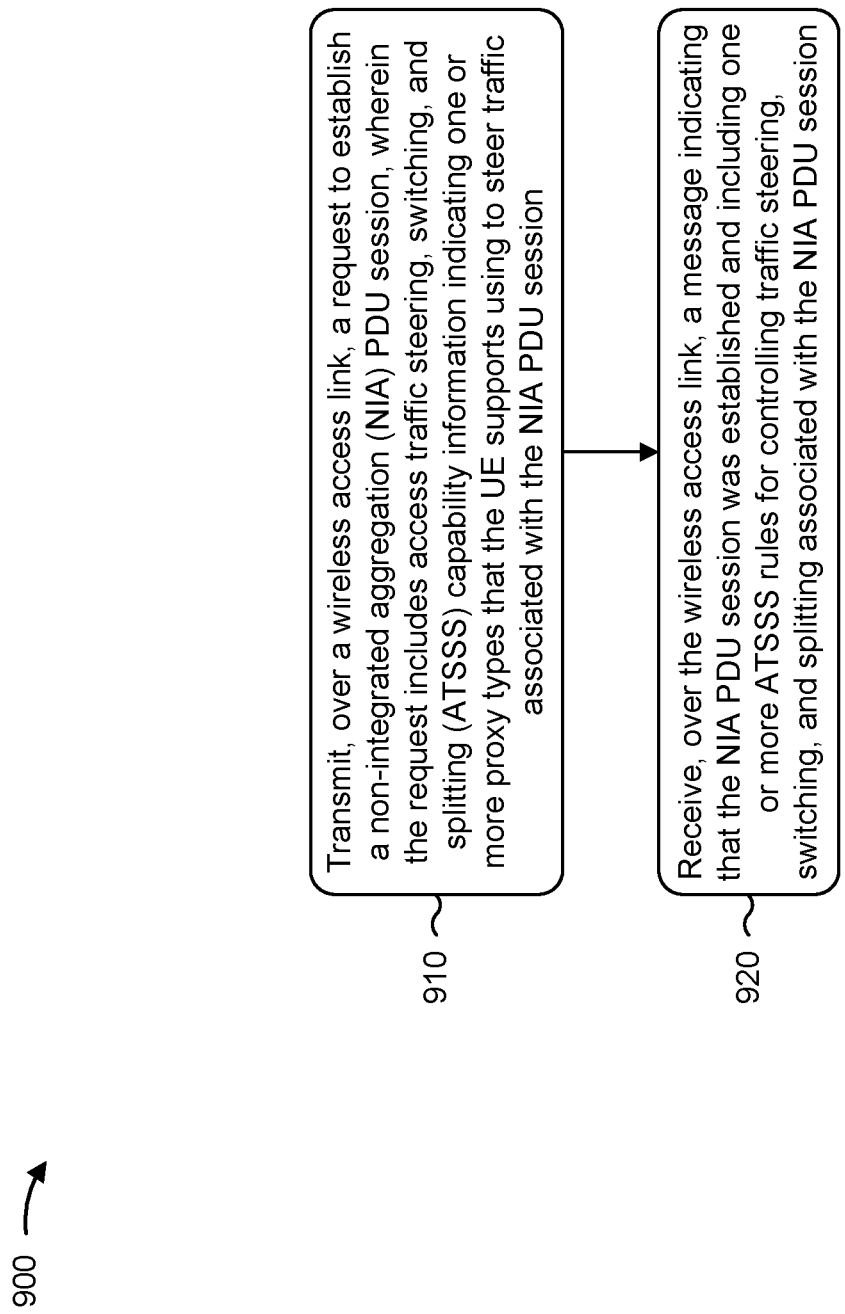
FIGS. 9-10 are diagrams illustrating example processes associated with non-integrated traffic aggregation, steering, and switching for a PDU session, in accordance with the present disclosure.

FIG. 9 is a diagram illustrating an example process 900 performed, for example, by a UE, in accordance with the present disclosure. Example process 900 is an example where the UE (e.g., UE 120) performs operations associated with non-integrated traffic aggregation, steering, and switching for a PDU session.

As shown in FIG. 9, in some aspects, process 900 may include transmitting, over a wireless access link, a request to establish an NIA PDU session, wherein the request includes ATSSS capability information indicating one or more proxy types that the UE supports using to steer traffic associated with the NIA PDU session (block 910). For example, the UE (e.g., using communication manager 140 and/or transmission component 1104, depicted in FIG. 11) may transmit, over a wireless access link, a request to establish an NIA PDU session, wherein the request includes ATSSS capability information indicating one or more proxy types that the UE supports using to steer traffic associated with the NIA PDU session, as described above.

As further shown in FIG. 9, in some aspects, process 900 may include receiving, over the wireless access link, a message indicating that the NIA PDU session was established and including one or more ATSSS rules for controlling traffic steering, switching, and splitting associated with the NIA PDU session (block 920). For example, the UE (e.g., using communication manager 140 and/or reception component 1102, depicted in FIG. 11) may receive, over the wireless access link, a message indicating that the NIA PDU session was established and including one or more ATSSS rules for controlling traffic steering, switching, and splitting associated with the NIA PDU session, as described above.

Process 900 may include additional aspects, such as any single aspect or any combination of aspects described below and/or in connection with one or more other processes described elsewhere herein.

In a first aspect, the request to establish the NIA PDU session is triggered using a URSP rule associated with an NIA access type.

In a second aspect, alone or in combination with the first aspect, the one or more proxy types supported by the UE include one or more of MPTCP aggregation functionality, UDP aggregation over H3, or UDP and IP aggregation over H3.

In a third aspect, alone or in combination with one or more of the first and second aspects, the request to establish the NIA PDU session and the message indicating that the NIA PDU session was established are sent over a 3GPP access path.

In a fourth aspect, alone or in combination with one or more of the first through third aspects, the message indicating that the NIA PDU session was established includes proxy information associated with the NIA PDU session based at least in part on the one or more proxy types supported by the UE.

In a fifth aspect, alone or in combination with one or more of the first through fourth aspects, the proxy information includes a proxy IP address type, one or more proxy IP addresses, a proxy port per access type, and a proxy type.

In a sixth aspect, alone or in combination with one or more of the first through fifth aspects, the proxy information includes a first IP address and port for accessing a UPF via an N3 interface associated with the wireless access link and a second IP address and port for accessing the UPF via an NX interface associated with an IP network.

In a seventh aspect, alone or in combination with one or more of the first through sixth aspects, the one or more ATSSS rules indicate a steering mode for controlling the traffic steering, switching, and splitting associated with the NIA PDU session in an uplink direction.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
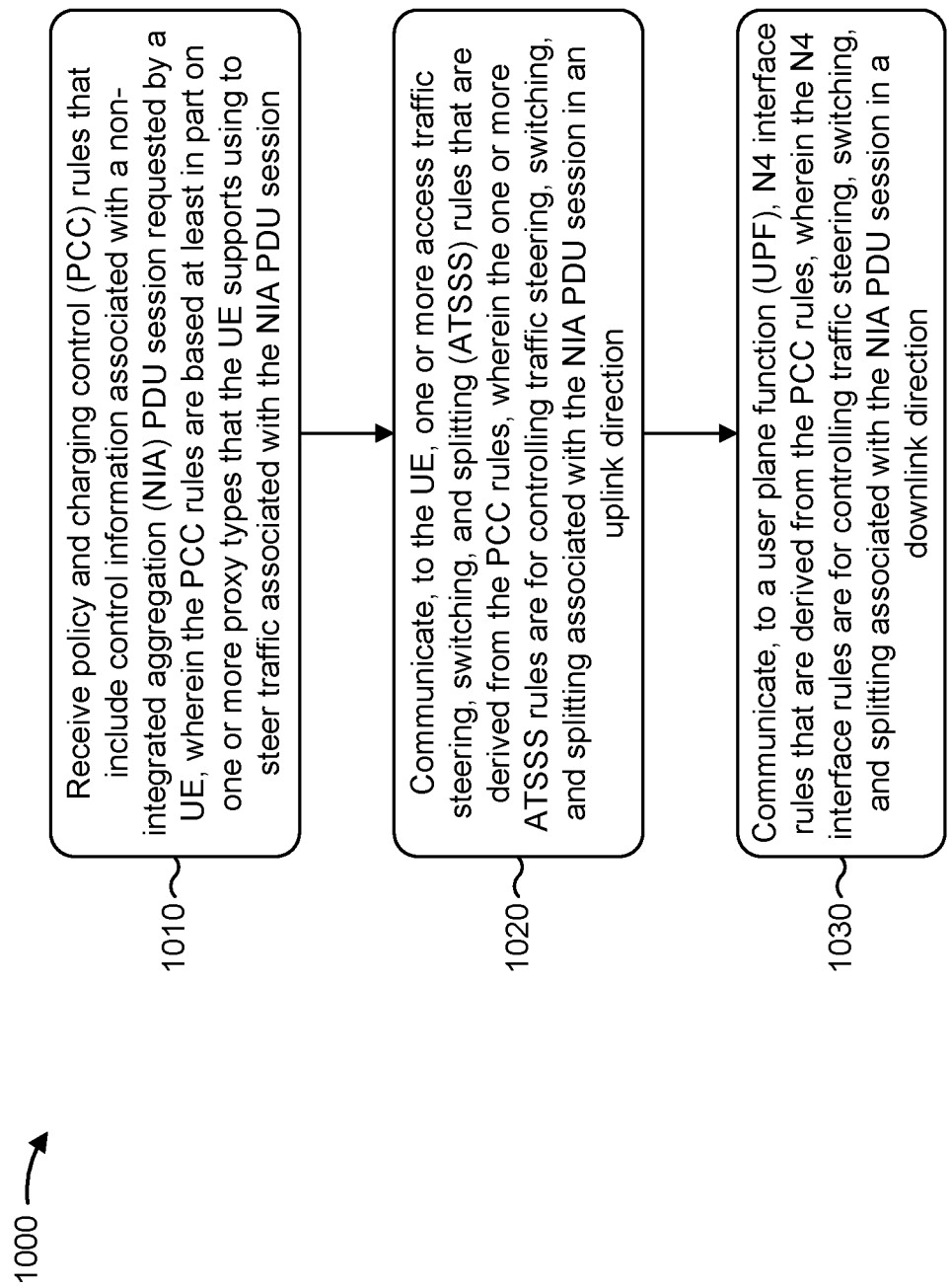

FIG. 10 is a diagram illustrating an example process 1000 performed, for example, by a network node, in accordance with the present disclosure. Example process 1000 is an example where the network node (e.g., an SMF) performs operations associated with non-integrated traffic aggregation, steering, and switching for a PDU session.

As shown in FIG. 10, in some aspects, process 1000 may include receiving PCC rules that include control information associated with an NIA PDU session requested by a UE, wherein the PCC rules are based at least in part on one or more proxy types that the UE supports using to steer traffic associated with the NIA PDU session (block 1010). For example, the network node (e.g., using communication manager 150 and/or reception component 1202, depicted in FIG. 12) may receive PCC rules that include control information associated with an NIA PDU session requested by a UE, wherein the PCC rules are based at least in part on one or more proxy types that the UE supports using to steer traffic associated with the NIA PDU session, as described above.

As further shown in FIG. 10, in some aspects, process 1000 may include communicating, to the UE, one or more ATSSS rules that are derived from the PCC rules, wherein the one or more ATSSS rules are for controlling traffic steering, switching, and splitting associated with the NIA PDU session in an uplink direction (block 1020). For example, the network node (e.g., using communication manager 150 and/or transmission component 1204, depicted in FIG. 12) may communicate, to the UE, one or more ATSSS rules that are derived from the PCC rules, wherein the one or more ATSSS rules are for controlling traffic steering, switching, and splitting associated with the NIA PDU session in an uplink direction, as described above.

As further shown in FIG. 10, in some aspects, process 1000 may include communicating, to a UPF, N4 interface rules that are derived from the PCC rules, wherein the N4 interface rules are for controlling traffic steering, switching, and splitting associated with the NIA PDU session in a downlink direction (block 1030). For example, the network node (e.g., using communication manager 150 and/or transmission component 1204, depicted in FIG. 12) may communicate, to a UPF, N4 interface rules that are derived from the PCC rules, wherein the N4 interface rules are for controlling traffic steering, switching, and splitting associated with the NIA PDU session in a downlink direction, as described above.

Process 1000 may include additional aspects, such as any single aspect or any combination of aspects described below and/or in connection with one or more other processes described elsewhere herein.

In a first aspect, the request to establish the NIA PDU session is triggered using a URSP rule associated with an NIA access type.

In a second aspect, alone or in combination with the first aspect, the one or more proxy types supported by the UE include one or more of MPTCP aggregation functionality, UDP aggregation over H3, or UDP and IP aggregation over H3.

In a third aspect, alone or in combination with one or more of the first and second aspects, a request from the UE to establish the NIA PDU session and a response message indicating the one or more ATSSS rules are sent over a 3GPP access path.

In a fourth aspect, alone or in combination with one or more of the first through third aspects, the one or more ATSSS rules are communicated to the UE in a message that includes proxy information associated with the NIA PDU session based at least in part on the one or more proxy types supported by the UE.

In a fifth aspect, alone or in combination with one or more of the first through fourth aspects, the proxy information includes a proxy IP address type, one or more proxy IP addresses, a proxy port per access type, and a proxy type.

In a sixth aspect, alone or in combination with one or more of the first through fifth aspects, the proxy information includes a first IP address and port for accessing the UPF via an N3 interface and a second IP address and port for accessing the UPF via an NX interface.

In a seventh aspect, alone or in combination with one or more of the first through sixth aspects, the N4 interface rules indicate proxy functionality that the UPF is to activate for the NIA PDU session.

In an eighth aspect, alone or in combination with one or more of the first through seventh aspects, the network node is an SMF.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
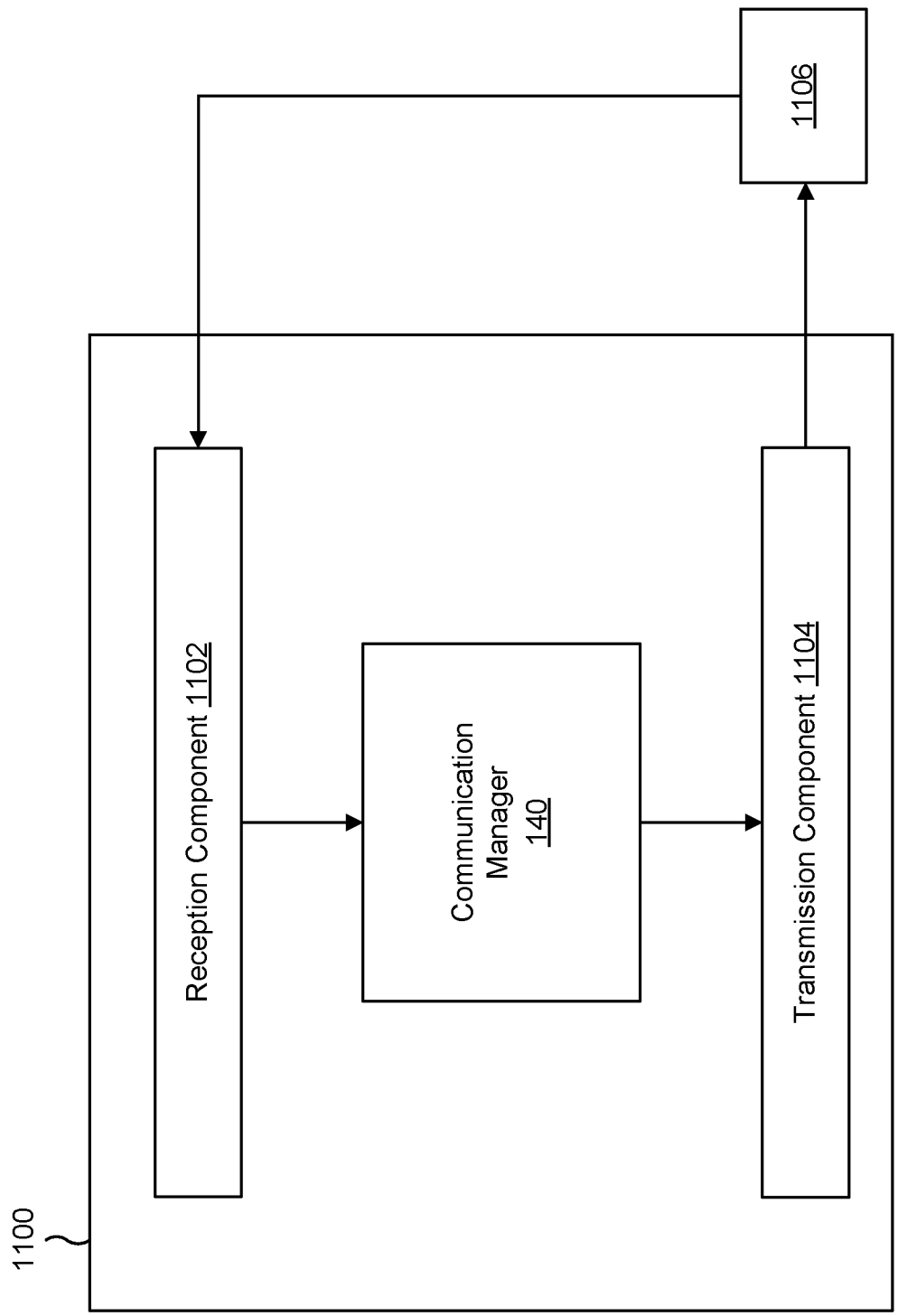
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140.

In some aspects, the apparatus 1100 may be configured to perform one or more operations described herein in connection with FIGS. 7A-7B and/or FIGS. 8A-8B. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, over a wireless access link, a request to establish an NIA PDU session, wherein the request includes ATSSS capability information indicating one or more proxy types that the UE supports using to steer traffic associated with the NIA PDU session. The reception component 1102 may receive, over the wireless access link, a message indicating that the NIA PDU session was established and including one or more ATSSS rules for controlling traffic steering, switching, and splitting associated with the NIA PDU session.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
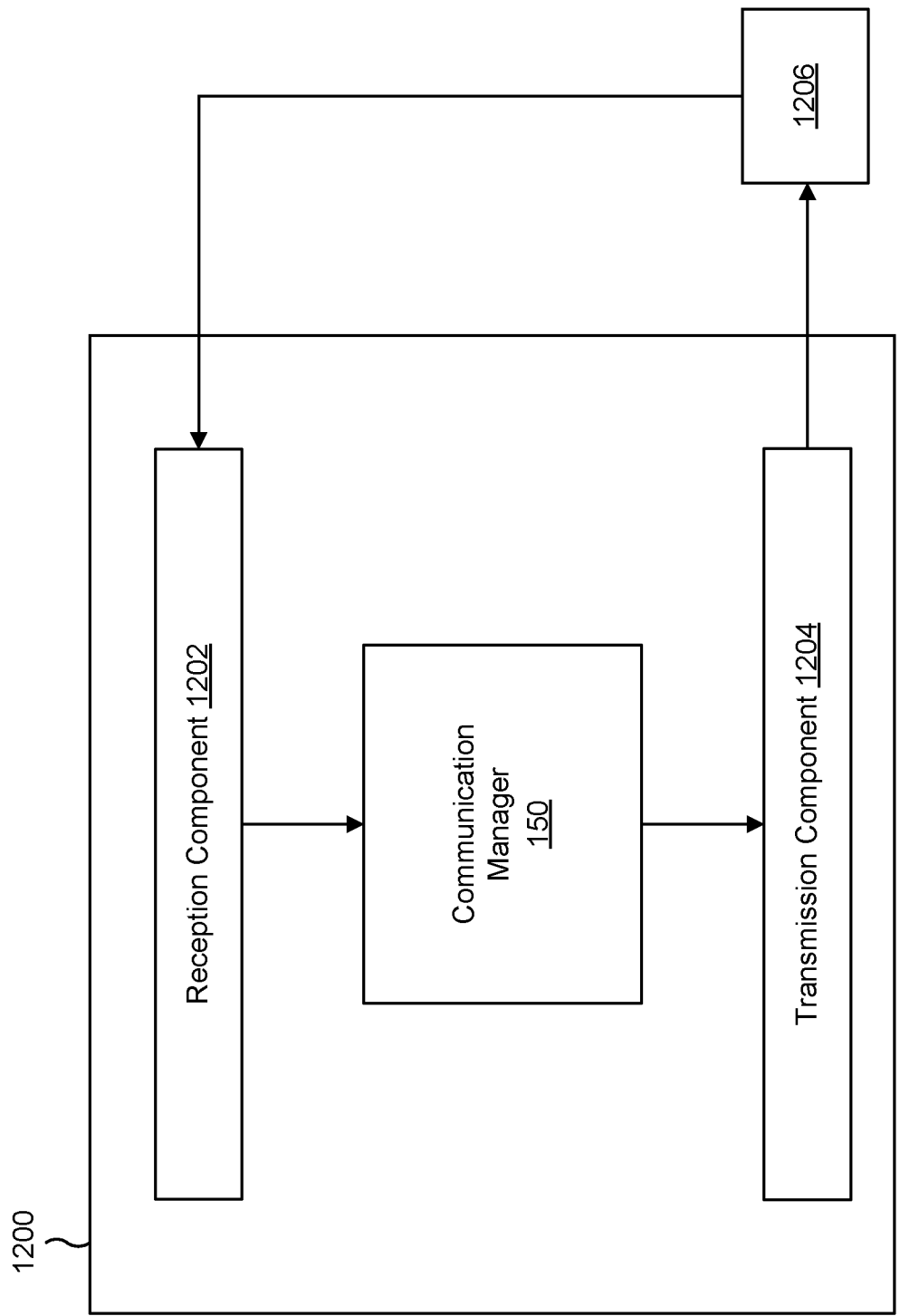

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150.

In some aspects, the apparatus 1200 may be configured to perform one or more operations described herein in connection with FIGS. 7A-7B and/or FIGS. 8A-8B. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The reception component 1202 may receive PCC rules that include control information associated with an NIA PDU session requested by a UE, wherein the PCC rules are based at least in part on one or more proxy types that the UE supports using to steer traffic associated with the NIA PDU session. The transmission component 1204 may communicate, to the UE, one or more ATSSS rules that are derived from the PCC rules, wherein the one or more ATSSS rules are for controlling traffic steering, switching, and splitting associated with the NIA PDU session in an uplink direction. The transmission component 1204 may communicate, to a UPF, N4 interface rules that are derived from the PCC rules, wherein the N4 interface rules are for controlling traffic steering, switching, and splitting associated with the NIA PDU session in a downlink direction.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: transmitting, over a wireless access link, a request to establish an NIA PDU session, wherein the request includes ATSSS capability information indicating one or more proxy types that the UE supports using to steer traffic associated with the NIA PDU session; and receiving, over the wireless access link, a message indicating that the NIA PDU session was established and including one or more ATSSS rules for controlling traffic steering, switching, and splitting associated with the NIA PDU session.

Aspect 2: The method of Aspect 1, wherein the request to establish the NIA PDU session is triggered using a URSP rule associated with an NIA access type.

Aspect 3: The method of any of Aspects 1-2, wherein the one or more proxy types supported by the UE include one or more of MPTCP aggregation functionality, UDP aggregation over H3, or UDP and IP aggregation over H3.

Aspect 4: The method of any of Aspects 1-3, wherein the request to establish the NIA PDU session and the message indicating that the NIA PDU session was established are sent over a 3GPP access path.

Aspect 5: The method of any of Aspects 1-4, wherein the message indicating that the NIA PDU session was established includes proxy information associated with the NIA PDU session based at least in part on the one or more proxy types supported by the UE.

Aspect 6: The method of Aspect 5, wherein the proxy information includes a proxy IP address type, one or more proxy IP addresses, a proxy port per access type, and a proxy type.

Aspect 7: The method of any of Aspects 5-6, wherein the proxy information includes a first IP address and port for accessing a UPF via an N3 interface associated with the wireless access link and a second IP address and port for accessing the UPF via an NX interface associated with an IP network.

Aspect 8: The method of any of Aspects 1-7, wherein the one or more ATSSS rules indicate a steering mode for controlling the traffic steering, switching, and splitting associated with the NIA PDU session in an uplink direction.

Aspect 9: A method of wireless communication performed by a network node, comprising: receiving PCC rules that include control information associated with an NIA PDU session requested by a UE, wherein the PCC rules are based at least in part on one or more proxy types that the UE supports using to steer traffic associated with the NIA PDU session; communicating, to the UE, one or more ATSSS rules that are derived from the PCC rules, wherein the one or more ATSSS rules are for controlling traffic steering, switching, and splitting associated with the MA PDU session in an uplink direction; and communicating, to a UPF, N4 interface rules that are derived from the PCC rules, wherein the N4 interface rules are for controlling traffic steering, switching, and splitting associated with the NIA PDU session in a downlink direction.

Aspect 10: The method of Aspect 9, wherein the request to establish the NIA PDU session is triggered using a URSP rule associated with an NIA access type.

Aspect 11: The method of any of Aspects 9-10, wherein the one or more proxy types supported by the UE include one or more of MPTCP aggregation functionality, UDP aggregation over H3, or UDP and IP aggregation over H3.

Aspect 12: The method of any of Aspects 9-11, wherein a request from the UE to establish the NIA PDU session and a response message indicating the one or more ATSSS rules are sent over a 3GPP access path.

Aspect 13: The method of any of Aspects 9-12, wherein the one or more ATSSS rules are communicated to the UE in a message that includes proxy information associated with the NIA PDU session based at least in part on the one or more proxy types supported by the UE.

Aspect 14: The method of Aspect 13, wherein the proxy information includes a proxy IP address type, one or more proxy IP addresses, a proxy port per access type, and a proxy type.

Aspect 15: The method of any of Aspects 13-14, wherein the proxy information includes a first IP address and port for accessing the UPF via an N3 interface and a second IP address and port for accessing the UPF via an NX interface.

Aspect 16: The method of any of Aspects 9-15, wherein the N4 interface rules indicate proxy functionality that the UPF is to activate for the NIA PDU session.

Aspect 17: The method of any of Aspects 9-16, wherein the network node is an SMF.

Aspect 18: An apparatus for wireless communication at a device, comprising a processor; memory coupled with the processor; and instructions stored in the memory and executable by the processor to cause the apparatus to perform the method of one or more of Aspects 1-8.

Aspect 19: A device for wireless communication, comprising a memory and one or more processors coupled to the memory, the one or more processors configured to perform the method of one or more of Aspects 1-8.

Aspect 20: An apparatus for wireless communication, comprising at least one means for performing the method of one or more of Aspects 1-8.

Aspect 21: A non-transitory computer-readable medium storing code for wireless communication, the code comprising instructions executable by a processor to perform the method of one or more of Aspects 1-8.

Aspect 22: A non-transitory computer-readable medium storing a set of instructions for wireless communication, the set of instructions comprising one or more instructions that, when executed by one or more processors of a device, cause the device to perform the method of one or more of Aspects 1-8.

Aspect 23: An apparatus for wireless communication at a device, comprising a processor; memory coupled with the processor; and instructions stored in the memory and executable by the processor to cause the apparatus to perform the method of one or more of Aspects 9-17.

Aspect 24: A device for wireless communication, comprising a memory and one or more processors coupled to the memory, the one or more processors configured to perform the method of one or more of Aspects 9-17.

Aspect 25: An apparatus for wireless communication, comprising at least one means for performing the method of one or more of Aspects 9-17.

Aspect 26: A non-transitory computer-readable medium storing code for wireless communication, the code comprising instructions executable by a processor to perform the method of one or more of Aspects 9-17.

Aspect 27: A non-transitory computer-readable medium storing a set of instructions for wireless communication, the set of instructions comprising one or more instructions that, when executed by one or more processors of a device, cause the device to perform the method of one or more of Aspects 9-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   transmitting, over a wireless access link, a request to establish a non-integrated aggregation (NIA) protocol data unit (PDU) session, wherein the request includes access traffic steering, switching, and splitting (ATSSS) capability information indicating one or more proxy types that the UE supports using to steer traffic associated with the NIA PDU session, wherein the one or more proxy types each correspond to two or more Internet Protocol (IP) addresses; and receiving, over the wireless access link, a message indicating that the NIA PDU session was established and including one or more ATSSS rules for controlling traffic steering, switching, and splitting associated with the NIA PDU session.

2. The method of claim 1, wherein the request to establish the NIA PDU session is triggered using a UE route selection policy (URSP) rule associated with an NIA access type.

3. The method of claim 1, wherein the one or more proxy types supported by the UE include one or more of Multipath Transmission Control Protocol (MPTCP) aggregation functionality, User Datagram Protocol (UDP) aggregation over Hypertext Transfer Protocol 3 (H3), or UDP and IP aggregation over H3.

4. The method of claim 1, wherein the request to establish the NIA PDU session and the message indicating that the NIA PDU session was established are sent over a Third Generation Partnership Project (3GPP) access path.

5. The method of claim 1, wherein the message indicating that the NIA PDU session was established includes proxy information associated with the NIA PDU session based at least in part on the one or more proxy types supported by the UE.

6. The method of claim 5, wherein the proxy information includes a proxy IP address type, the two or more IP addresses, a proxy port per access type, and a proxy type.

7. The method of claim 5, wherein the proxy information includes a first IP address and port for accessing a user plane function (UPF) via an N3 interface associated with the wireless access link and a second IP address and port for accessing the UPF via an NX interface associated with an IP network.

8. The method of claim 1, wherein the one or more ATSSS rules indicate a steering mode for controlling the traffic steering, switching, and splitting associated with the NIA PDU session in an uplink direction.

9. A method of wireless communication performed by a network node, comprising:
receiving policy and charging control (PCC) rules that include control information associated with a request to establish a non-integrated aggregation (NIA) protocol data unit (PDU) session, by a user equipment (UE), wherein the PCC rules are based at least in part on one or more proxy types that the UE supports using to steer traffic associated with the NIA PDU session, wherein the one or more proxy types each correspond to two or more Internet Protocol (IP) addresses;
communicating, to the UE, one or more access traffic steering, switching, and splitting (ATSSS) rules that are derived from the PCC rules, wherein the one or more ATSSS rules are for controlling traffic steering, switching, and splitting associated with the NIA PDU session in an uplink direction; and
communicating, to a user plane function (UPF), N4 interface rules that are derived from the PCC rules, wherein the N4 interface rules are for controlling traffic steering, switching, and splitting associated with the NIA PDU session in a downlink direction.

10. The method of claim 9, wherein the request to establish the NIA PDU session is triggered using a UE route selection policy (URSP) rule associated with an NIA access type.

11. The method of claim 9, wherein the one or more proxy types supported by the UE include one or more of Multipath Transmission Control Protocol (MPTCP) aggregation functionality, User Datagram Protocol (UDP) aggregation over Hypertext Transfer Protocol 3 (H3), or UDP and IP aggregation over H3.

12. The method of claim 9, wherein a request from the UE to establish the NIA PDU session and a response message indicating the one or more ATSSS rules are sent over a Third Generation Partnership Project (3GPP) access path.

13. The method of claim 9, wherein the one or more ATSSS rules are communicated to the UE in a message that includes proxy information associated with the NIA PDU session based at least in part on the one or more proxy types supported by the UE.

14. The method of claim 13, wherein the proxy information includes a proxy IP address type, the two or more IP addresses, a proxy port per access type, and a proxy type.

15. The method of claim 13, wherein the proxy information includes a first IP address and port for accessing the UPF via an N3 interface and a second IP address and port for accessing the UPF via an NX interface.

16. The method of claim 9, wherein the N4 interface rules indicate proxy functionality that the UPF is to activate for the NIA PDU session.

17. The method of claim 9, wherein the network node is a session management function.

18. A user equipment (UE) for wireless communication, comprising:
a memory; and
one or more processors, coupled to the memory, configured to:
transmit, over a wireless access link, a request to establish a non-integrated aggregation (NIA) protocol data unit (PDU) session, wherein the request includes access traffic steering, switching, and splitting (ATSSS) capability information indicating one or more proxy types that the UE supports using to steer traffic associated with the NIA PDU session, wherein the one or more proxy types each correspond to two or more Internet Protocol (IP) addresses; and
receive, over the wireless access link, a message indicating that the NIA PDU session was established and including one or more ATSSS rules for controlling traffic steering, switching, and splitting associated with the NIA PDU session.

19. The UE of claim 18, wherein the request to establish the NIA PDU session is triggered using a UE route selection policy (URSP) rule associated with an NIA access type.

20. The UE of claim 18, wherein the one or more proxy types supported by the UE include one or more of Multipath Transmission Control Protocol (MPTCP) aggregation functionality, User Datagram Protocol (UDP) aggregation over Hypertext Transfer Protocol 3 (H3), or UDP and IP aggregation over H3.

21. The UE of claim 18, wherein the request to establish the NIA PDU session and the message indicating that the NIA PDU session was established are sent over a Third Generation Partnership Project (3GPP) access path.

22. The UE of claim 18, wherein the message indicating that the NIA PDU session was established includes proxy information associated with the NIA PDU session based at least in part on the one or more proxy types supported by the UE.

23. The UE of claim 22, wherein the proxy information includes a first IP address and port for accessing a user plane function (UPF) via an N3 interface associated with the wireless access link and a second IP address and port for accessing the UPF via an NX interface associated with an IP network.

24. The UE of claim 18, wherein the one or more ATSSS rules indicate a steering mode for controlling the traffic steering, switching, and splitting associated with the NIA PDU session in an uplink direction.

25. A network node for wireless communication, comprising:
a memory; and
one or more processors, coupled to the memory, configured to:
receive policy and charging control (PCC) rules that include control information associated with a request to establish a non-integrated aggregation (NIA) protocol data unit (PDU) session requested, by a user equipment (UE), wherein the PCC rules are based at least in part on one or more proxy types that the UE supports using to steer traffic associated with the NIA PDU session, wherein the one or more proxy types each correspond to two or more Internet Protocol (IP) addresses;
communicate, to the UE, one or more access traffic steering, switching, and splitting (ATSSS) rules that are derived from the PCC rules, wherein the one or more ATSSS rules are for controlling traffic steering, switching, and splitting associated with the NIA PDU session in an uplink direction; and
communicate, to a user plane function (UPF), N4 interface rules that are derived from the PCC rules, wherein the N4 interface rules are for controlling traffic steering, switching, and splitting associated with the NIA PDU session in a downlink direction.

26. The network node of claim 25, wherein the request to establish the NIA PDU session is triggered using a UE route selection policy (URSP) rule associated with an NIA access type.

27. The network node of claim 25, wherein the one or more proxy types supported by the UE include one or more of Multipath Transmission Control Protocol (MPTCP) aggregation functionality, User Datagram Protocol (UDP) aggregation over Hypertext Transfer Protocol 3 (H3), or UDP and IP aggregation over H3.

28. The network node of claim 25, wherein a request from the UE to establish the NIA PDU session and a response message indicating the one or more ATSSS rules are sent over a Third Generation Partnership Project (3GPP) access path.

29. The network node of claim 25, wherein the one or more ATSSS rules are communicated to the UE in a message that includes proxy information associated with the NIA PDU session based at least in part on the one or more proxy types supported by the UE.

30. The network node of claim 25, wherein the N4 interface rules indicate proxy functionality that the UPF is to activate for the NIA PDU session.

* * * * *